(12) United States Patent
Matsuda

(10) Patent No.: US 8,867,084 B2
(45) Date of Patent: Oct. 21, 2014

(54) MANAGEMENT SYSTEM FOR MANAGING AN IMAGE FORMING APPARATUS, CONTROL METHOD THEREOF, PRINT SYSTEM, AND NON-TRANSITORY COMPUTER-READABLE MEDIUM

(71) Applicant: Canon Kabushiki Kaisha, Tokyo (JP)

(72) Inventor: Kotaro Matsuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/147,634

(22) Filed: Jan. 6, 2014

(65) Prior Publication Data

US 2014/0211247 A1 Jul. 31, 2014

(30) Foreign Application Priority Data

Jan. 29, 2013 (JP) ................. 2013-014834

(51) Int. Cl.
| | |
|---|---|
| *G06F 15/00* | (2006.01) |
| *G06F 3/12* | (2006.01) |
| *G06K 1/00* | (2006.01) |
| *G06K 15/00* | (2006.01) |

(52) U.S. Cl.
CPC ............ *G06F 3/1219* (2013.01); *G06F 3/1273* (2013.01)
USPC ....................................... 358/1.15

(58) Field of Classification Search
CPC ... G06F 3/1297; G06F 3/1219; G06F 3/1273; G06K 15/02
USPC ................. 358/1.15, 1.13, 1.1, 1.14
See application file for complete search history.

(56) References Cited

U.S. PATENT DOCUMENTS

2011/0310428 A1* 12/2011 Ciriza et al. ................. 358/1.15
2012/0262753 A1* 10/2012 Viccari et al. ................ 358/1.15

FOREIGN PATENT DOCUMENTS

JP 2011-242922 A 12/2011

* cited by examiner

*Primary Examiner* — Douglas Tran
(74) *Attorney, Agent, or Firm* — Rossi, Kimms & McDowell LLP

(57) ABSTRACT

A system comprises: a processing unit which performs layout processing on data of a job; a holding unit which holds, in a storage unit, identification information of an image forming apparatus, identification information of the job and content of the layout processing performed on the data of the job by the processing unit in association with each other; a unit which transmits the data that has undergone the layout processing to the image forming apparatus and obtains history information of the processed job; and a tally unit which performs tally processing with respect to the processed job, by using the history information and the content of the layout processing held in the storage unit in association with the identification information of the image forming apparatus corresponding to the history information and identification information of the job in the history information.

16 Claims, 26 Drawing Sheets

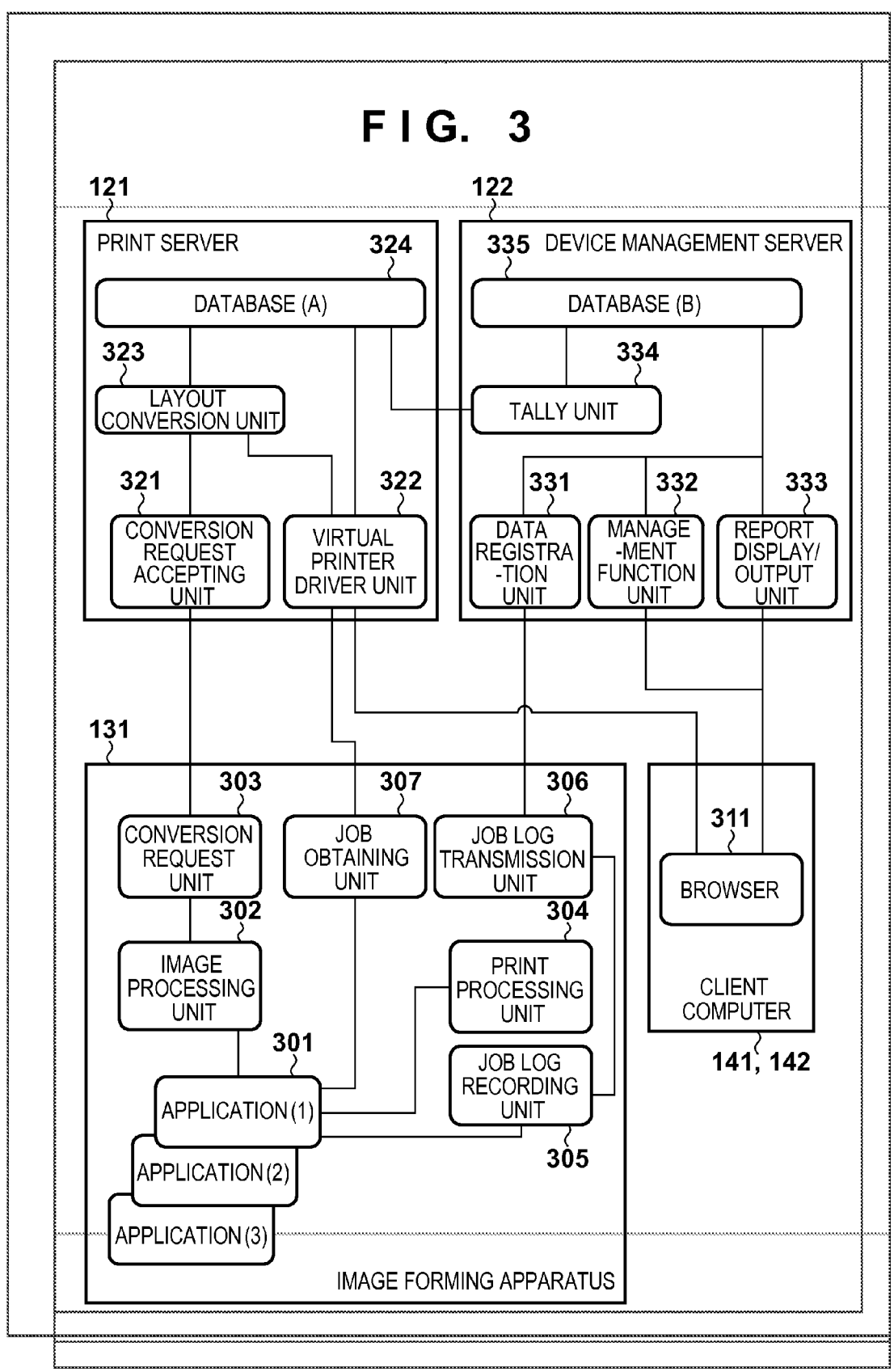

| TABLE NAME | DEVICE INFORMATION MANAGEMENT TABLE | | |
|---|---|---|---|
| DEVICE SERIAL ID | MANUFACTURER NAME | MODEL NAME | ... |
| NNN000001 | GANON | C5185 | ... |
| MMM000009 | GANON | L3500 | ... |

| TABLE NAME | TENANT MANAGEMENT TABLE | |
|---|---|---|
| TENANT ID | TENANT NAME | ... |
| AAA00001 | XYZ TRADING CORPORATION | ... |
| AAA00002 | PQR ELECTRIC CORPORATION | ... |

| TABLE NAME | USER MANAGEMENT TABLE | |
|---|---|---|
| USER ID | USER NAME | ... |
| XXX@AAA00001 | XXX YYY | ... |
| YYY@AAA00002 | YYY ZZZ | ... |
| ZZZ@AAA00002 | ZZZ ZZZ | ... |

DEVICE MANAGEMENT TABLE[AAA00002]

| DEVICE SERIAL ID | MANUFACTURER NAME | MODEL NAME | DEVICE TYPE | COLOR CLASSIFICATION |
|---|---|---|---|---|
| NNN000001 | GANON | C5180 | MFP | CL |
| MMM000009 | GANON | L3500 | SFP | BW |

FIG. 8B

DEVICE DATA UPDATED DATE/TIME TABLE[AAA00002]

| DEVICE SERIAL ID | TYPE OF DATA | DATE AND TIME OF FINAL DATA |
|---|---|---|
| NNN000001 | JOB LOG | 2012/05/13 02:04:52 |
| NNN000002 | JOB LOG | 2012/05/13 23:12:20 |

| JOB ID | JOB START DATE AND TIME | JOB END DATE AND TIME | JOB NAME | JOB EXECUTING USER | JOB END CODE | TYPE OF JOB |
|---|---|---|---|---|---|---|
| 0001-00000001 | 2012/05/14 14:00:11 | 2012/05/14 14:02:33 | Presentation. PDF | XYZ | 1 | PRINT |
| 0001-00000002 | 2012/05/14 15:25:41 | 2012/05/14 15:26:02 | COPY 002 | ABC | 1 | COPY |
| 901 | 902 | 903 | 904 | 905 | 906 | 907 |

| PAPER SIZE | NUMBER OF COLOR PAGES | NUMBER OF MONOCHROME PAGES | N-up PRINTING | DOUBLE-SIDED PRINTING | NUMBER OF COLOR PRINT SHEETS | NUMBER OF MONOCHROME PRINT SHEETS | NUMBER OF SHEETS OF PRINTING PAPER |
|---|---|---|---|---|---|---|---|
| A4 | 20 | 10 | 2 | ON | 9 | 6 | 8 |
| A4 | 8 | 0 | 1 | ON | 8 | 0 | 4 |
| 908 | 909 | 910 | 911 | 912 | 913 | 914 | 915 |

FIG. 10A

| TABLE NAME | JOB LOG TABLE [AAA00002] | | | | | | |
|---|---|---|---|---|---|---|---|
| DEVICE SERIAL ID | JOB ID | JOB START DATE AND TIME | JOB END DATE AND TIME | JOB NAME | JOB EXECUTING USER | JOB END CODE | TYPE OF JOB |
| NNN000001 | 0001-00000001 | 2012/05/14 14:00:11 | 2012/05/14 14:02:33 | Presentation.PDF | XYZ | 1 | PRINT |
| NNN000001 | 0001-00000002 | 2012/05/14 15:25:41 | 2012/05/14 15:26:02 | Report.PDF | XYZ | 1 | COPY |

| TABLE NAME | DETAILED JOB LOG TABLE [AAA00002] | | | | | | | | |
|---|---|---|---|---|---|---|---|---|---|
| DEVICE SERIAL ID | JOB ID | PAPER SIZE | NUMBER OF COLOR PAGES | NUMBER OF MONOCHROME PAGES | N-up PRINTING | DOUBLE-SIDED PRINTING | NUMBER OF COLOR PRINT SHEETS | NUMBER OF MONOCHROME PRINT SHEETS | NUMBER OF SHEETS OF PRINTING PAPER |
| NNN000001 | 0001-00000001 | A4 | 20 | 10 | 2 | ON | 9 | 6 | 8 |
| NNN000001 | 0001-00000002 | A4 | 8 | 4 | 2 | ON | 4 | 2 | 3 |

TENANT TALLY SETTING TABLE [AAA00002] ~1100

| TABLE NAME | | | |
|---|---|---|---|
| START MONTH OF A YEAR | DAILY CLOSE TIME | MONTHLY CLOSE DATE | APPLIED TIME ZONE | TALLY START STANDBY TIME |
| 1 | 0:00 | 25 | America/New York | 6:00:00 |
| ~1101 | ~1102 | ~1103 | ~1104 | ~1105 |

FIG. 11B

JOB LOG TALLY RESULT TABLE [AAA00002] ~1110

| TABLE NAME | | | | | | | |
|---|---|---|---|---|---|---|---|
| DEVICE SERIAL ID | UNIT OF TIME | TALLY YEAR | TALLY MONTH | TALLY DATE | TALLY COMPLETION DATE AND TIME | TALLY COMPLETED STATE | FINAL JOB ID |
| NNN000001 | DAILY | 2012 | 04 | 24 | 2012/04/25 6:01:22 | COMPLETED | 0001-00003056 |
| NNN000001 | DAILY | 2012 | 04 | 25 | 2012/04/26 6:03:50 | COMPLETED | 0001-00003821 |
| NNN000001 | MONTHLY | 2012 | 04 | | 2012/04/26 6:06:18 | HALFWAY | — |
| ~1111 | ~1112 | ~1113 | ~1114 | ~1115 | ~1116 | ~1117 | ~1118 |

F I G. 12A  SERVICE EXECUTION HISTORY TABLE [AAA00002] ~1200

| TABLE NAME | | | | | |
|---|---|---|---|---|---|
| JOB TICKET ID | START DATE AND TIME | END DATE AND TIME | DEVICE SERIAL ID | JOB ID | USED IN PRINTING |
| JT01-00000001 | 2012/05/14 10:51:22 | 2012/05/14 10:51:43 | NNN000001 | 0001-00000912 | — |
| JT01-00000002 | 2012/05/14 11:02:31 | 2012/05/14 11:03:02 | NNN000002 | 0001-00008050 | FALSE |

~1201  ~1202  ~1203  ~1204  ~1205  ~1206

F I G. 12B  DETAILED SERVICE EXECUTION HISTORY TABLE [AAA00002] ~1210

| TABLE NAME | | |
|---|---|---|
| JOB TICKET ID | SERVICE ID | FUNCTION ID |
| JT01-00000001 | S-00001 | F-001 |
| JT01-00000001 | S-00001 | F-003 |
| JT01-00000001 | S-00001 | F-005 |

~1211  ~1212  ~1213

F I G. 12C  METADATA RECORD TABLE [AAA00002] ~1214

| TABLE NAME | | | | | |
|---|---|---|---|---|---|
| METADATA ID | NUMBER OF PAGES OF ORIGINAL | NUMBER OF PAGES AFTER LAYOUT CONVERSION PROCESSING | NUMBER OF PAGES REDUCED | REFERENCE METADATA ID | |
| M001-00000001 | 30 | 27 | 3 | M001-00000001 | |
| M001-00000002 | 27 | 22 | 5 | M001-00000002 | |
| M001-00000003 | 22 | 12 | 10 | M001-00000003 | |

~1221  ~1222  ~1223  ~1224  ~1220

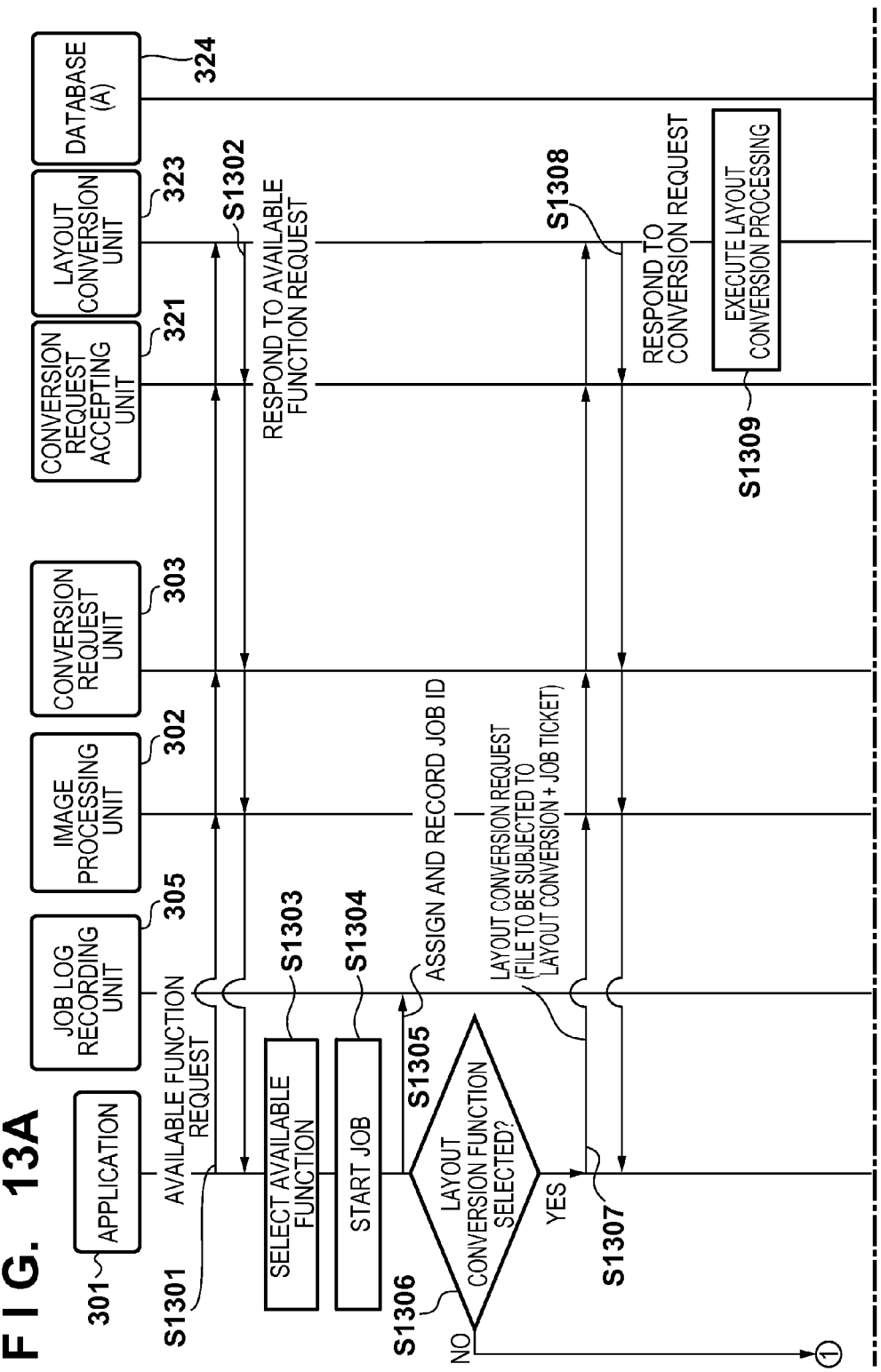

F I G. 14

1401

```
<?xml version="1.0" encoding="UTF-8"?>
<JobTicket>
        <TargetService ServiceId="S-00001">
                <Function FunctionId="F-001"></Function>
                <Function FunctionId="F-003"></Function>
                <Function FunctionId="F-005"></Function>
        </TargetService>
        <JobInformation DeviceSerialId="NNN000001" JobId="0001-00000001">
        </JobInformation>
</JobTicket>
```

```
<?xml version="1.0" encoding="UTF-8"?>
<CountingDefinition Id="1" Name="PRINTING PAPER SAVING EFFECTS">
    <Service ServiceId="S-00001" Name="LAYOUT CONVERSION SERVICE">
        <Function FunctionId="F-001" Name="MARGIN DELETION"></Function>
        <Function FunctionId="F-003" Name="IMAGE OBJECT DELETION"></Function>
        <Function FunctionId="F-005" Name="COMBINED LAYOUT"></Function>
    </Service>
</CountingDefinition>
```

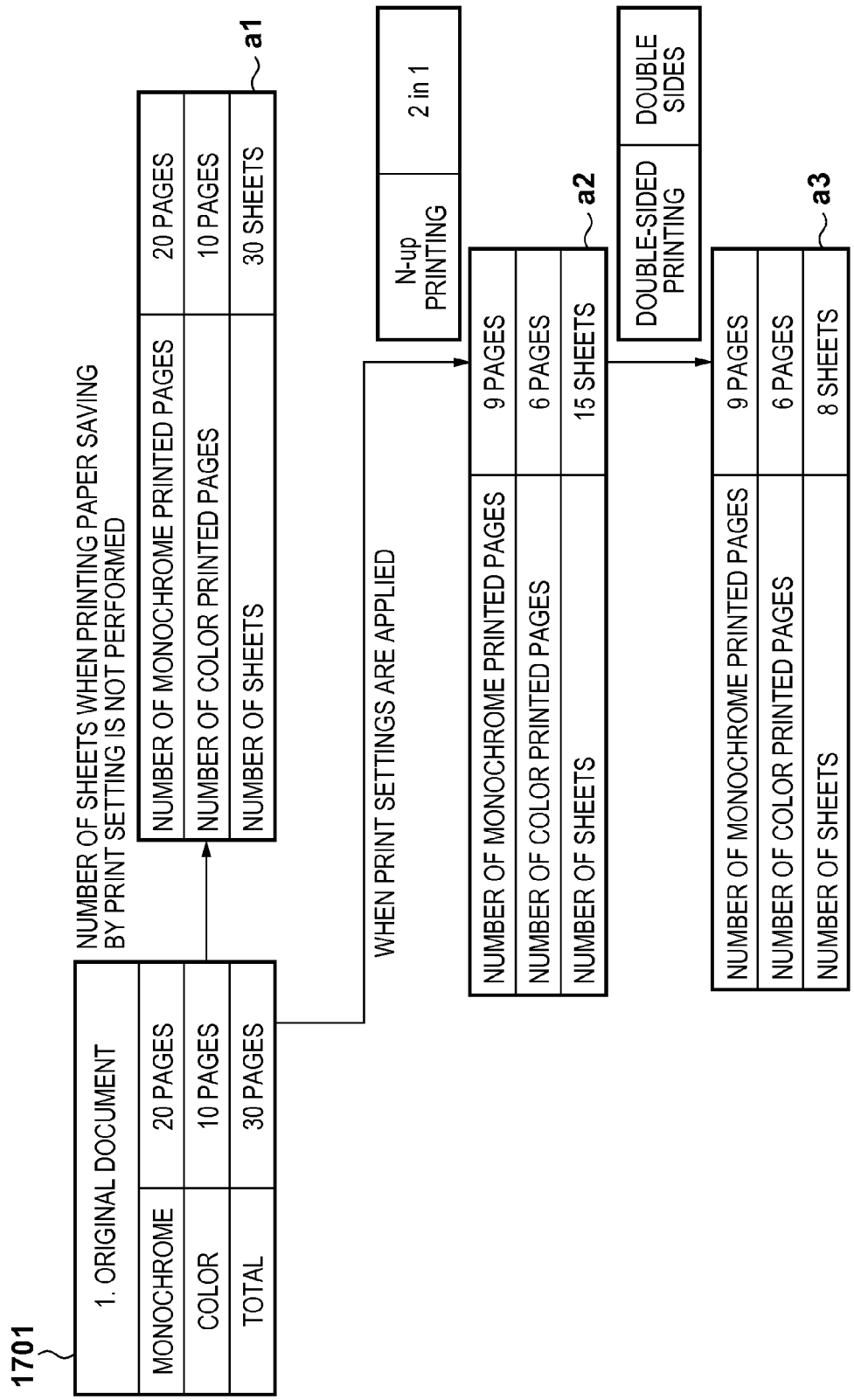

FIG. 20

TABLE NAME: PRINTING PAPER SAVING EFFECTS TALLY TABLE [AAA00002] ~2000

| DEVICE SERIAL ID | TALLY DATE OR MONTH | TYPE OF PRINTING | NUMBER OF PRINTING SHEETS USED | NUMBER OF SHEETS SAVED BY N-up PRINTING | NUMBER OF SHEETS SAVED BY DOUBLE-SIDED PRINTING | NUMBER OF SHEETS SAVED BY LAYOUT CONVERSION FUNCTION (1) | NUMBER OF SHEETS SAVED BY LAYOUT CONVERSION FUNCTION (3) | NUMBER OF SHEETS SAVED BY LAYOUT CONVERSION FUNCTION (5) |
|---|---|---|---|---|---|---|---|---|
| NNN000001 | 2012/05/14 | NORMAL PRINTING | 656 | 182 | 129 | 0 | 0 | 0 |
| NNN000001 | 2012/05/14 | LAYOUT CONVERSION PRINTING | 501 | 52 | 49 | 30 | 12 | 23 |
| NNN000001 | 2012/05/15 | NORMAL PRINTING | 709 | 198 | 106 | 0 | 0 | 0 |
| NNN000001 | 2012/05/15 | LAYOUT CONVERSION PRINTING | 626 | 60 | 52 | 40 | 16 | 29 |
| NNN000001 | 2012/05 | NORMAL PRINTING | 10350 | 3685 | 3021 | 0 | 0 | 0 |
| NNN000001 | 2012/05 | LAYOUT CONVERSION PRINTING | 8953 | 926 | 780 | 701 | 105 | 303 |
| ... | ... | ... | ... | ... | ... | ... | ... | ... |
| ALL | 2012/05/15 | NORMAL PRINTING | 23093 | 12111 | 5688 | 0 | 0 | 0 |
| ALL | 2012/05/15 | LAYOUT CONVERSION PRINTING | 15432 | 2289 | 1231 | 3345 | 634 | 1250 |
| ALL | 2012/05 | NORMAL PRINTING | 453317 | 215433 | 141233 | 0 | 0 | 0 |
| ALL | 2012/05 | LAYOUT CONVERSION PRINTING | 325565 | 32441 | 25321 | 48954 | 8291 | 7832 |

2001  2002  2003  2004  2005  2006  2007  2008  2009

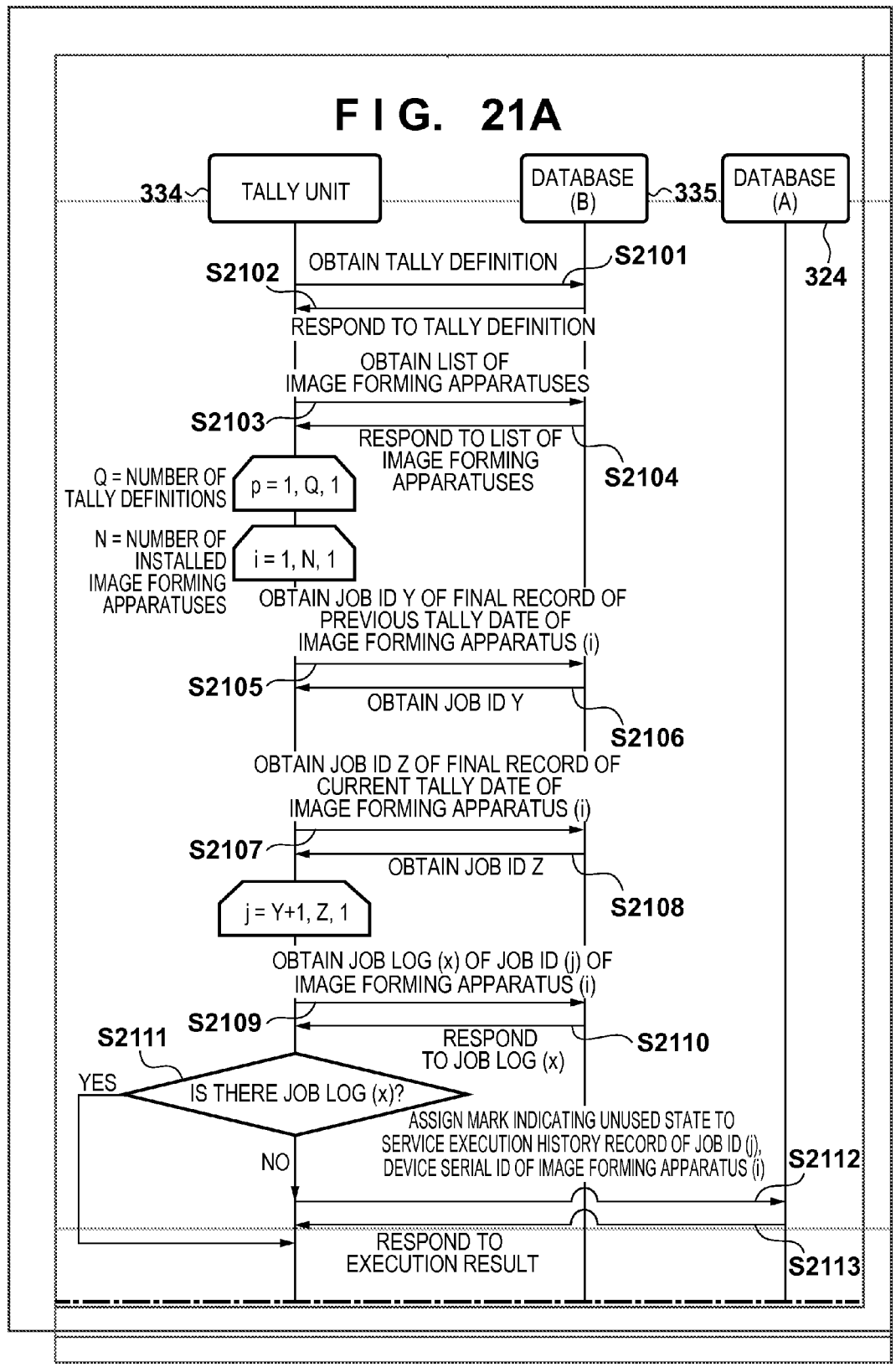

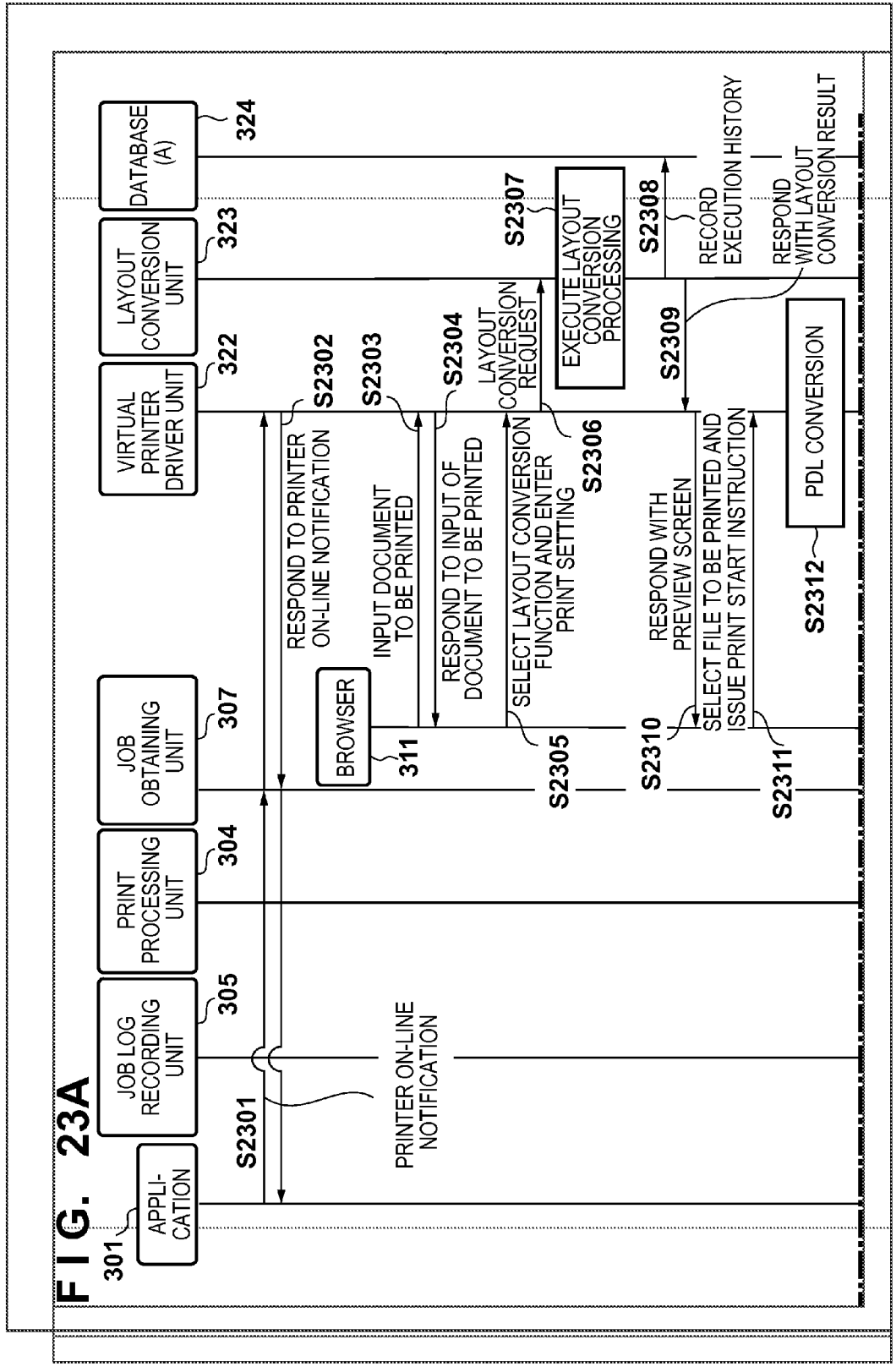

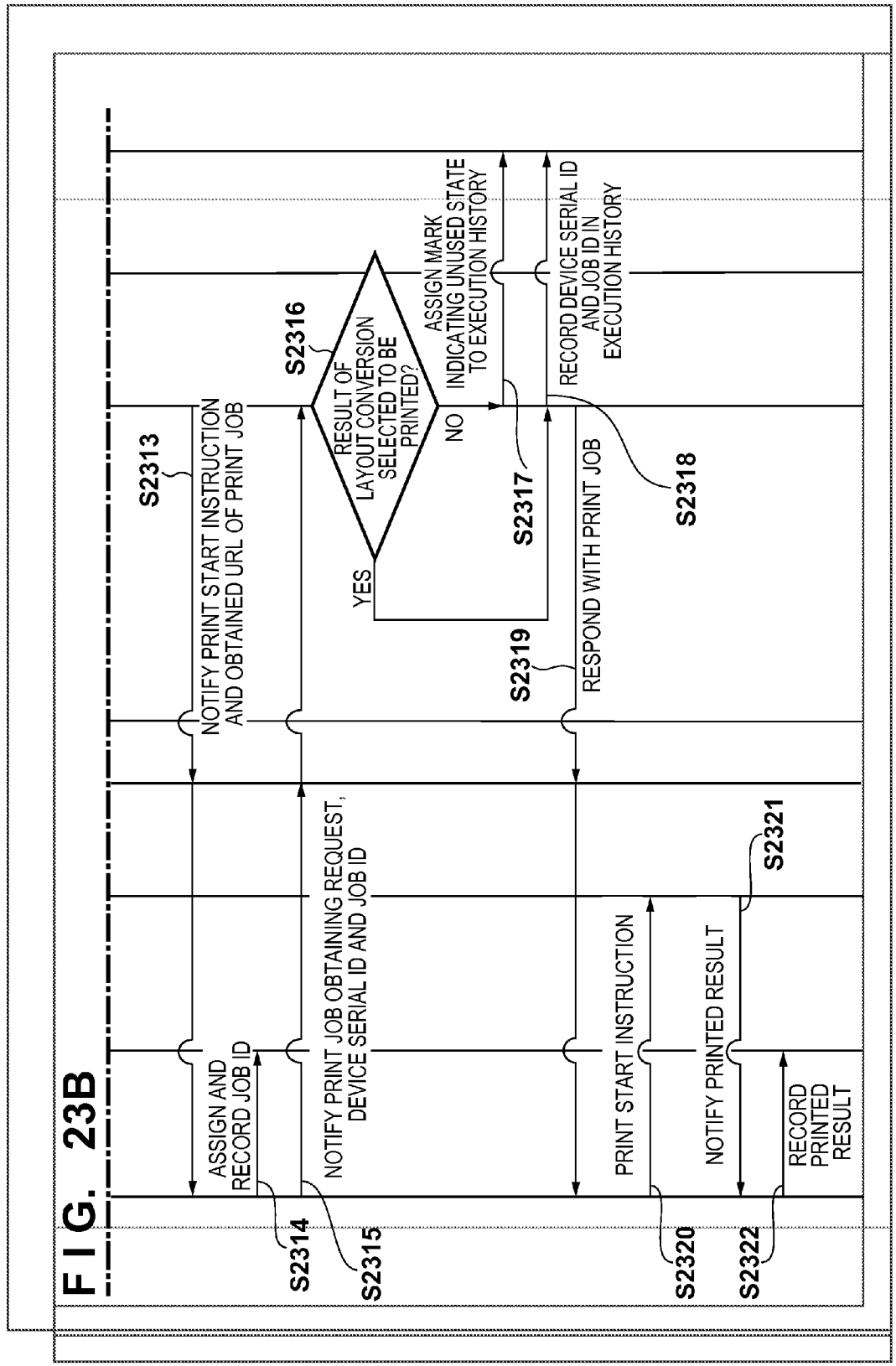

MANAGEMENT SYSTEM FOR MANAGING AN IMAGE FORMING APPARATUS, CONTROL METHOD THEREOF, PRINT SYSTEM, AND NON-TRANSITORY COMPUTER-READABLE MEDIUM

BACKGROUND OF THE INVENTION

1. Field of the Invention

The present invention relates to a management system that manages image forming apparatuses, a control method thereof, an image forming apparatus, a control method thereof, a print system, and a non-transitory computer-readable medium. The present invention particularly relates to a technique for realizing tally processing of resource saving effects at the time of printing with an image forming apparatus.

2. Description of the Related Art

Device management applications have been provided that manage business-use image forming apparatuses such as multifunction peripherals and printers. Such a device management application manages image forming apparatuses installed in an organization such as a company or an association and ascertains the utilization status of each image forming apparatus. Data such as when, who and how many times each function of the image forming apparatus such as copying, scanning or printing was used is recorded as job logs. The job logs are collected and tallied, which enables detailed analysis of executed jobs such as the ratio of color printing and the ratio of double-sided printing. In recent years, from the viewpoint of a reduction in a customers' TCO (Total Cost of Ownership), such device management applications are of increased importance for customers and dealers in multifunction peripherals and printers.

One of the functions of the device management application is to tally and report how much printing paper has been saved by the print settings set for print jobs such as copy jobs and print jobs in the image forming apparatus. The print settings include single-sided or double-sided printing, printing multiple pages per sheet (also referred to as N-up or N in 1 printing) that allows printing multiple pages on a single sheet of paper, and the like. A comparison is made between the number of sheets of printing paper required to print an original document to be printed with settings of single-sided printing and no N-up printing and the number of sheets of printing paper required to print the same with a setting of double-sided printing or N-up printing, and the difference is reported as a printing paper saving effect.

Also, a layout conversion function of changing the layout of a document to be printed so as to save resources such as paper and toner has been provided by applications that perform pre-printing processing. The layout conversion is a technique for recognizing a character region, a graphic region, an image region, a margin region and the like of each page of a document to be printed and re-laying out the content to be printed by deleting an unnecessary region or narrowing the margin region. Through the processing, saving effects such as reducing the number of pages of the document to be printed can be obtained.

The above technique, however, is problematic in that such a pre-printing processing application passes, to a printer driver, the content to be printed that has undergone layout conversion processing and has a reduced number of pages, and thus the image forming apparatus cannot, ascertain the data on pages saved by layout conversion processing. Accordingly, it is necessary to report the saving effects obtained by layout conversion processing of the pre-printing processing application at an application level, which differs from the report of the printing paper saving effects provided by the device management application. Also, the saving effects obtained by layout conversion processing at an application level is an estimated value, and is not an actual value with which saving is achieved until the image forming apparatus actually finishes printing of the content to be printed.

Japanese Patent Laid-Open No. 2011-242922 discloses a method in which both first reduction information obtained by print settings set in a PC and second reduction information obtained by blank removing/color reduction processing set in an image forming apparatus are recorded in a history record associated with a print job. However, the first reduction information is received from the printer driver, the second reduction information is obtained by the image forming apparatus itself, and these two pieces of information are recorded in the history record. Accordingly, it is not possible to record resource saving effects executed by an external application other than the image forming apparatus or the printer driver, and thus the above problem cannot be solved.

SUMMARY OF THE INVENTION

According to one aspect of the present invention, there is provided a management system comprising: a processing unit configured to perform layout processing on data of a job processed by an image forming apparatus; a holding unit configured to hold, in a storage unit, identification information of the image forming apparatus, identification information of the job and content of the layout processing performed on the data of the job by the processing unit in association with each other; a transmission unit configured to transmit the data that has undergone the layout processing to the image forming apparatus; an obtaining unit configured to obtain history information of the job processed by the image forming apparatus; and a tally unit configured to perform tally processing with respect to the job processed by the image forming apparatus, by using the history information and the content of the layout processing held in the storage unit in association with the identification information of the image forming apparatus corresponding to the history information and the identification information of the job included in the history information.

According to another aspect of the present invention, there is provided an image forming apparatus comprising: a holding unit configured to hold, in a storage unit, a job whose print settings have been designated; a request unit configured to send a request for layout processing on data of the job to a management system; an accepting unit configured to accept the data that has undergone the layout processing from the management system; a processing unit configured to perform processing on the job by using the data that has undergone the layout, processing and the print settings; and a transmission unit configured to transmit history information of the job processed by the processing unit in order to perform tally processing in the management system, wherein the request and the history information include identification information of the image forming apparatus and identification information of the job.

According to another aspect of the present invention, there is provided a print system comprising a management system and an image forming apparatus, wherein the management system comprises: a processing unit configured to perform layout processing on data of a job processed by an image forming apparatus; a holding unit configured to hold, in a storage unit, identification information of the image forming apparatus, identification information of the job and content of the layout processing performed on the data of the job by the processing unit in association with each other; a transmission unit configured to transmit the data that has undergone the layout processing to the image forming apparatus; an obtaining unit configured to obtain history information of the job processed by the image forming apparatus; and a tally unit configured to perform tally processing with respect to the job processed by the image forming apparatus, by using the history information and the content of the layout processing held in the storage unit in association with the identification information of the image forming apparatus corresponding to the history information and the identification information of the job included in the history information, and wherein the image forming apparatus comprises: a holding unit, configured to hold, in a storage unit, a job whose print settings have been designated; a request unit configured to send a request for layout processing on data of the job to a management system; an accepting unit configured to accept the data that has undergone the layout processing from the management system; a processing unit configured to perform processing on the job by using the data that has undergone the layout processing and the print settings; and a transmission unit configured to transmit history information of the job processed by the processing unit in order to perform tally processing in the management system, wherein the request and the history information include identification information of the image forming apparatus and identification information of the job.

According to another aspect of the present invention, there is provided a method for controlling a management system comprising: a processing step of performing layout processing on data of a job processed by an image forming apparatus; a holding step of holding, in a storage unit, identification information of the image forming apparatus, identification information of the job and content of the layout processing performed on the data of the job in the processing step in association with each other; a transmission step of transmitting the data that has undergone the layout processing to the image forming apparatus; an obtaining step of obtaining history information of the job processed by the image forming apparatus; and a tally step of performing tally processing with respect to the job processed by the image forming apparatus, by using the history information and the content of the layout processing held in the storage unit in association with the identification information of the image forming apparatus corresponding to the history information and the identification information of the job included in the history information.

According to another aspect of the present invention, there is provided a method for controlling an image forming apparatus comprising: a holding step of holding, in a storage unit, a job whose print settings have been designated; a requesting step of sending a request for layout processing on data of the job to a management system; an accepting step of accepting the data that has undergone layout processing from the management system; a processing step of processing the job by using the data that has undergone the layout processing and the print settings; and a transmission step of transmitting history information of the job processed in the processing step in order to perform tally processing in the management system, wherein the request and the history information include identification information of the image forming apparatus and identification information of the job.

According to another aspect of the present invention, there is provided a non-transitory computer-readable medium storing a program for causing a computer to function as: a processing unit configured to perform layout processing on data of a job processed by an image forming apparatus; a holding unit configured to hold, in a storage unit, identification information of the image forming apparatus, identification information of the job and content of the layout processing performed on the data of the job by the processing unit in association with each other; a transmission unit configured to transmit the data that has undergone the layout processing to the image forming apparatus; an obtaining unit configured to obtain history information of the job processed by the image forming apparatus; and a tally unit configured to perform tally processing with respect to the job processed by the image forming apparatus, by using the history information and the content of the layout processing held in the storage unit in association with the identification information of the image forming apparatus corresponding to the history information and the identification information of the job included in the history information.

According to another aspect of the present, invention, there is provided a non-transitory computer-readable medium storing a program for causing a computer to function as: a holding unit configured to hold, in a storage unit, a job whose print settings have been designated; a request unit configured to send a request for layout processing on data of the job to a management system; an accepting unit configured to accept the data that has undergone the layout processing from the management system; a processing unit configured to perform processing on the job by using the data that has undergone the layout processing and the print settings; and a transmission unit configured to transmit history information of the job processed by the processing unit in order to perform tally processing in the management system, wherein the request and the history information include identification information of the image forming apparatus and identification information of the job.

According to the present invention, it is possible to unify tallies of correct actual values of both resource saving effects obtained by a layout conversion function and resource saving effects obtained by a print setting in the image forming apparatus.

Further features of the present invention will become apparent from the following description of exemplary embodiments (with reference to the attached drawings).

BRIEF DESCRIPTION OF THE DRAWINGS

FIG. 3 is a diagram showing a software configuration of a system of the present invention and an example of a network interconnection.

FIGS. 7A, 7B and 7C are diagrams showing an example of a device information management table, a tenant, management table and a user management table.

FIGS. 8A and 8B are diagrams showing an example of a device management table and a device data updated date/time table.

FIG. 9 is a diagram showing an example of job log records.

FIGS. 10A and 10B are diagrams showing an example of a job log table and a detailed job log table.

FIGS. 11A and 11B are diagrams showing an example of a tenant tally setting table and a job log tally result table.

FIGS. 12A, 12B and 12C are diagrams showing an example of a service execution history table, a detailed service execution history table and a metadata record table.

FIGS. 13A and 13B are sequence diagrams illustrating a processing flow of sending a request for layout conversion processing from an image forming apparatus, executing the layout conversion processing and executing printing.

FIG. 14 is a diagram illustrating a data structure of a job ticket.

FIG. 16 is a diagram illustrating an example of a data structure of a tally definition.

FIG. 17 is a diagram illustrating changes in the number of pages of a document to be printed and the number of sheets required to print the document to be printed when a print setting is applied.

FIG. 20 is a diagram showing an example of a printing paper saving effect tally table.

FIGS. 21A and 21B are sequence diagrams illustrating a processing flow of tally processing.

FIGS. 23A and 23B are sequence diagrams illustrating a processing flow of sending a request for layout conversion processing from a client computer, executing the layout conversion processing and performing printing according to Embodiment 2.

DESCRIPTION OF THE EMBODIMENTS

Hereinafter, embodiments for carrying out the present invention will be described with reference to the drawings.

Embodiment 1

System Configuration

Figure 1:
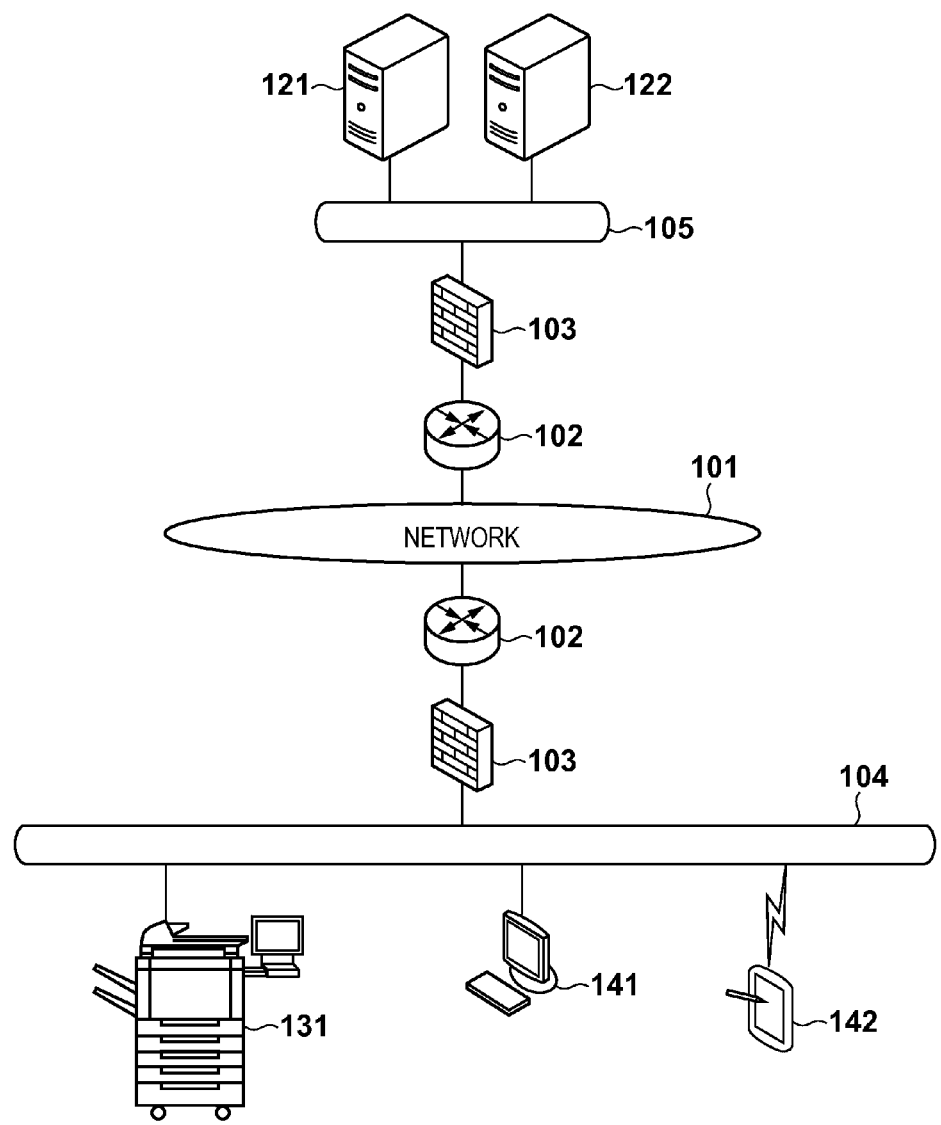
FIG. 1 is a diagram showing an example of a system configuration and a network configuration.

FIG. 1 shows an example of a system configuration and a network configuration for carrying out the present invention. A network 101 is a network such as the Internet or an intranet. Network devices 102 are network devices for connecting networks such as routers or switches. Firewalls 103 perform control to enable communication between networks. LANs (Local Area Networks) 104 and 105 are terminal networks that connect devices such as computers, but they are not limited to wired communication networks and may be wireless communication networks such as wireless LANs or mobile phone communication networks. In FIG. 1, the network 101 and the LANs 104 and 105 are connected via the network devices 102, and thus the devices under control of the LAN 104 and the devices under control of the LAN 105 are capable of communication with each other.

A print server 121 and a device management server 122 include various types of databases and are capable of executing necessary applications. Also, the print server 121 and the device management server 122 may be configured as physical machines or virtual machines. An image forming apparatus 131 can be an image forming apparatus such as a printer, a multifunction peripheral or the like. Client computers 141 and 142 are used in Embodiment 2.

Figure 2:
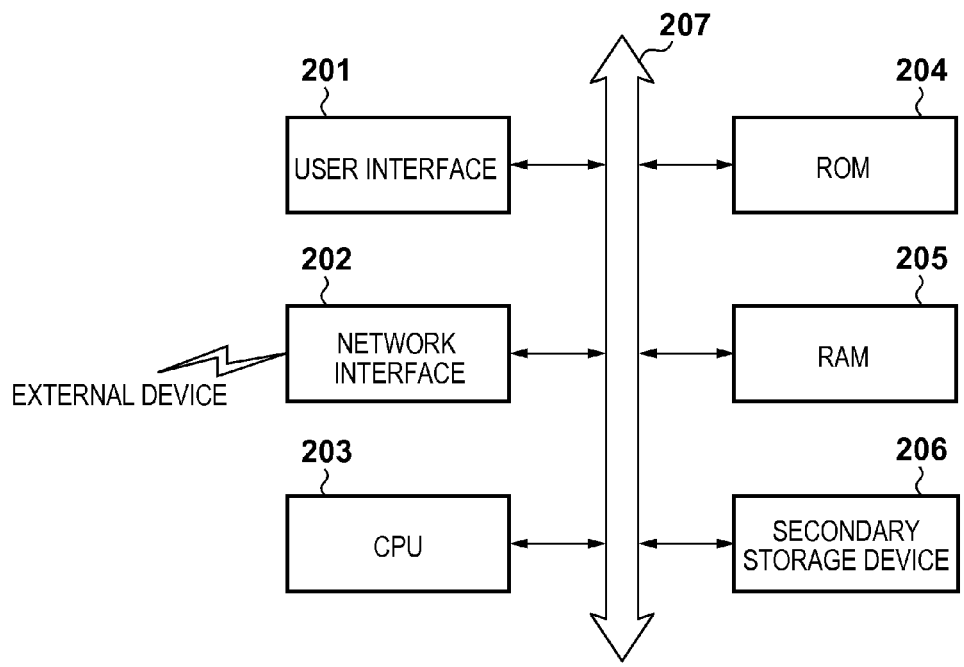
FIG. 2 is a diagram showing a hardware configuration of an information processing function.

FIG. 2 shows an example of a hardware configuration of an information processing function of the print server 121, the device management server 122, the image forming apparatus 131 and the client computers 141 and 142. A user interface 201 performs input and output of information in response to an operation on a display, a keyboard, a mouse, a touch panel or the like. A computer that does not include hardware as described above can be connected and operated from another computer by a remote desktop or the like. A network interface 202 connects to a network such as a LAN, and performs communication with other computers and network devices. In a ROM 204, embedded programs and data are recorded. A RAM 205 is used as a temporary memory area. A secondary storage device 206 is a storage unit as typified by a HDD. A CPU 203 executes programs read out from the ROM 204, the RAM 205, the secondary storage device 206 and the like. These units are connected via an input/output interface 207.

FIG. 3 shows a software configuration of a print system according to the present embodiment and an example of interconnection via a network. An application 301 is an application executed by the image forming apparatus 131. A plurality of applications 301 can be installed and executed in the image forming apparatus 131 according to the function and purpose. Examples of the applications 301 include applications that execute copying, scanning, printing and the like. An image processing unit 302 executes image processing on print data or the like. A conversion request unit 303 transmits a layout conversion request and receives the result of conversion to and from the print server 121. A print processing unit 304 processes print data input from application 301 and outputs the processed data onto a print medium.

A job log recording unit 305 records and stores therein a job log (history information) in response to a request from the application 301. A job log transmission unit 306 transmits the job log recorded in the job log recording unit. 305 to the device management server 122. A browser 311 is a browser or an equivalent application installed in the client computers 141 and 142. The browser 311 connects to the print server 121 and the device management server 122, and executes a necessary function. A conversion request, accepting unit 321 receives and processes the layout conversion request from the image forming apparatus 131.

A layout conversion unit 323 executes layout, conversion processing based on a request from the conversion request accepting unit 321. A database (A) 324 is a database for storing execution history data of the layout conversion unit 323. In the application of the print server 121 according to Embodiment 1, the application 301 of the image forming apparatus 131 requests, when executing a print job such as a copy job or a print job, the print server 121 to perform layout conversion processing on a document to be printed. The layout conversion unit 323 executes layout conversion processing and returns the result of conversion to the image forming apparatus 131, whereby saving of print resources at the time of printing can be achieved.

A database (B) 335 is a database for storing device management information, job logs and the like of the image forming apparatus 131. A data registration unit 331 receives data from the job log transmission unit 306 and registers the data in the database (B) 335. A management function unit 332 provides a display screen displaying a list of image forming apparatuses and management, information thereof or an operation screen to the browser 311. A report display/output, unit 333 searches and forms data stored in the database (B) 335 and provides a display screen to the browser 311 as a report of a table or graph.

A tally unit 334 executes tally processing on the data registered in the database (B) 335 and saves the tallied result in the database (B) 335. The image forming apparatus 131 regularly transits the recorded job logs to the device management server 122 so as to accumulate the job logs in the database (B) 335, and thereby enabling execution of tally processing by the tally unit 334 on a regular basis such as per day or per month. The tallied data is provided to the browser 311 via the report display/output unit 333. A job obtaining unit 307 and a virtual printer driver unit 322 are used in Embodiment 2, which will be described later.

Note that the present embodiment is described assuming that the print server 121 and the device management server 122 as a management system are different apparatuses, but they may be the same apparatus.

Layout Conversion Function

FIGS. 4A to 6B are illustrative diagrams showing examples of layout conversion functions as layout processing that can be executed by the layout conversion unit 323.

Figure 4A:
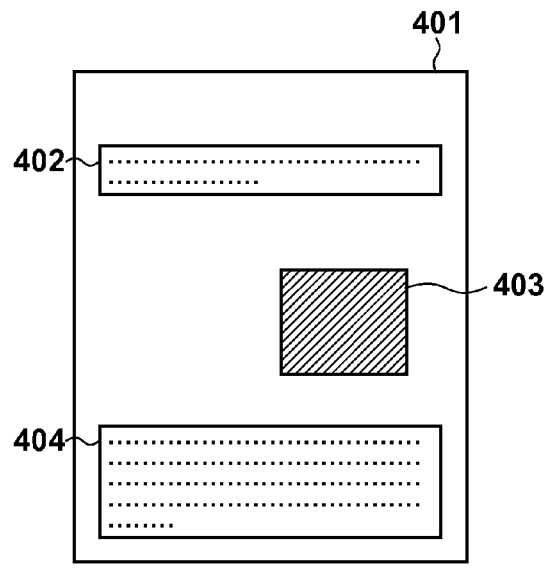
FIGS. 4A, 4B and 4C are diagrams illustrating an example of a layout conversion function (removal of margins).
Figure 4B:
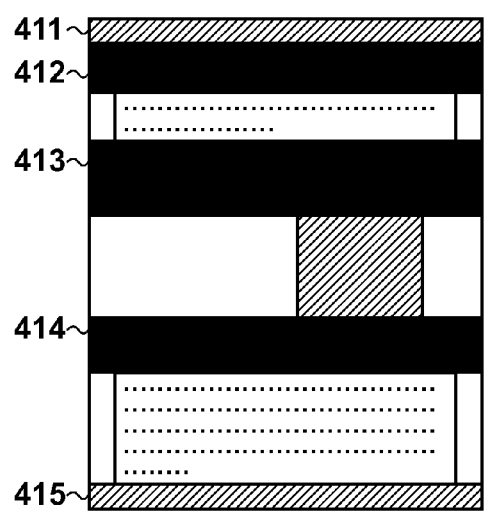
Figure 4C:
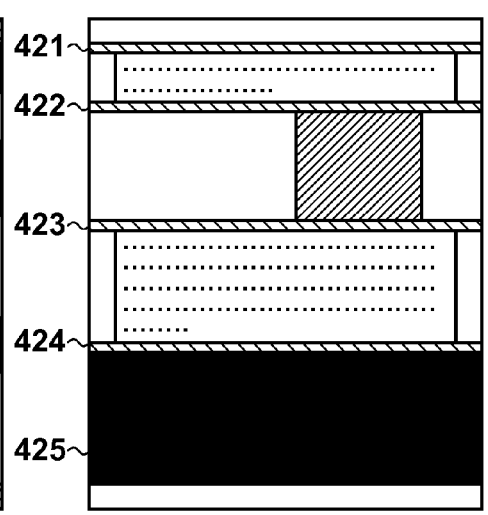

FIG. 4A to 4C are illustrative diagrams showing one example of a margin removal function. FIG. 4A shows a page 401 that is a given page of a file to be printed. The page 401 includes character regions 402 and 404, and a graphic or image region 403. The layout conversion unit 323 analyzes the content of the page 401 and divides a region other than the character regions 402 and 404 and the image region 403 into print margin regions 411 and 415, and margin regions 412, 413 and 414 as shown in FIG. 4B.

The print margins need to be left because they are regions where the printer cannot print, but the margin regions can be reduced. However, deletion of all of the margin regions may compromise the readability of the resulting printed matter, and thus the layout conversion unit 323 leaves minimum margin regions 421 to 424 as shown in FIG. 4C in order to maintain readability. A new margin region 425 is made at the bottom edge portion of the page by reducing the margin regions 412 to 414 and shifting the regions 402 to 404 that are regions to be printed toward the top edge of the page (in the upper direction of the page in FIG. 4). The layout conversion unit 323 performs the above processing sequentially from the first page. If it is possible to shift a region to be printed of the next page to the margin region made at the bottom edge portion of the current page, the layout conversion unit 323 shifts the region to be printed to the current page. By performing this processing on all pages, the margin regions are accumulated in the bottom edge portion, and when the accumulated margin regions account for one or more pages from the last page, by deleting the one or more pages including only margin regions, the number of pages to be printed can be reduced.

Figure 5A:
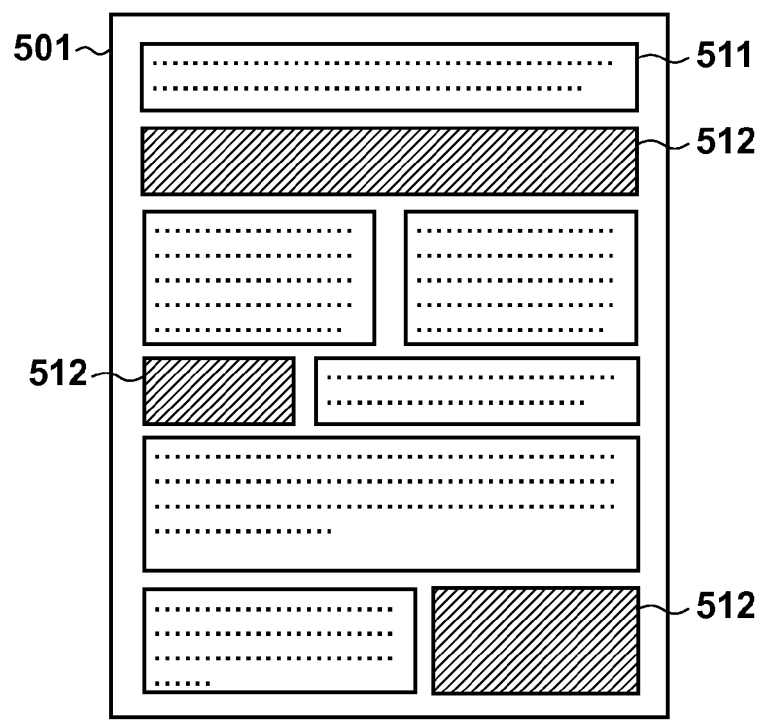
FIGS. 5A and 5B are diagrams illustrating an example of a layout conversion function (deletion and replacement of an image or character region).
Figure 5B:
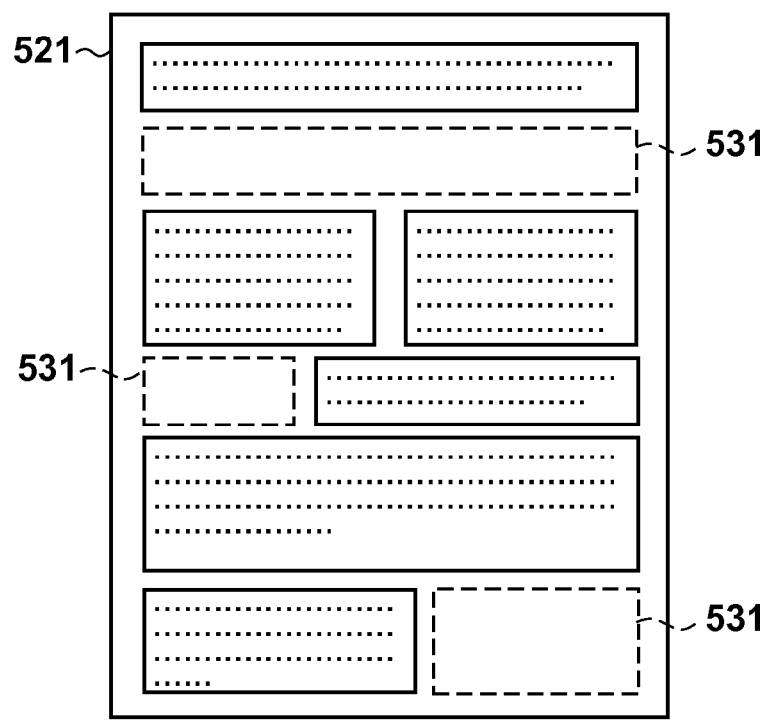

FIGS. 5A and 5B are illustrative diagrams showing an example of execution of an image/character region deletion and replacement function. A page 501 shown in FIG. 5A shows a given page of a file to be printed. The page 501 includes a character region 511 and an image region 512. If a user who desires printed matter wants to print out only the character region 511, processing can be performed to delete the image region 512 to make a margin, or to replace the image region 512 by a frame 531 as a substitute as shown in FIG. 5B, or the like. By doing so, unnecessary margin regions can be deleted, and the amount of toner can be reduced by replacing images. In contrast, if the user who desires printed matter wants to print out only the image region 512, the character region 511 can be deleted or replaced by a frame or the like.

Figure 6A:
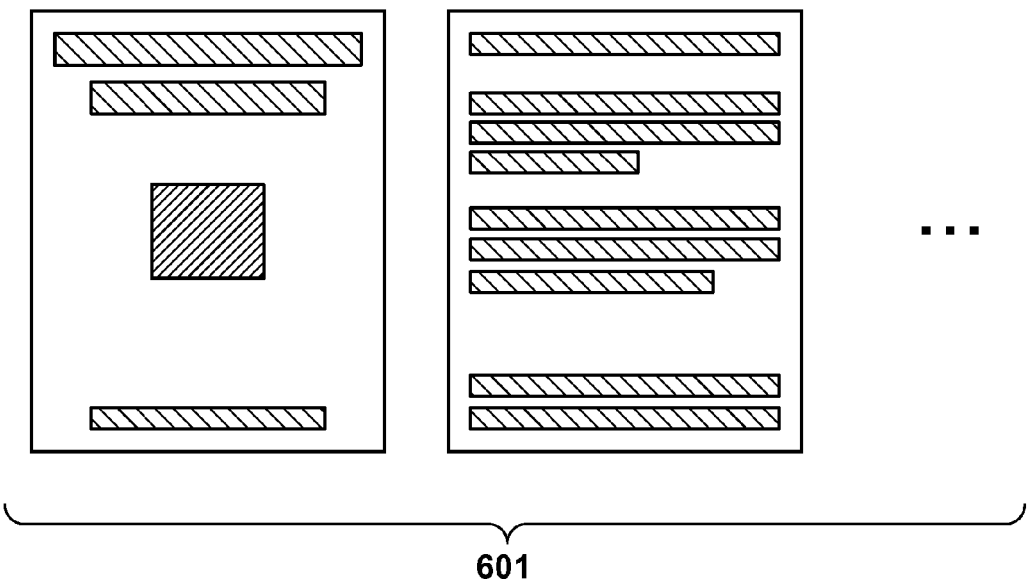
FIGS. 6A and 6B are diagrams illustrating an example of a layout conversion function (combined layout).
Figure 6B:
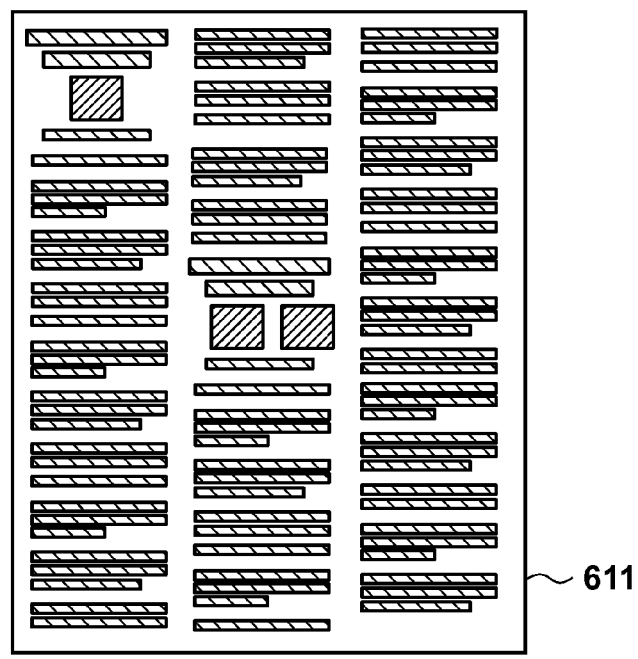

FIGS. 6A and 6B are illustrative diagrams showing an example of execution of a combined layout function. A document 601 to be printed shown in FIG. 6A is a document constituted by a plurality of pages. In addition to the margin removal processing described above, by automatically adjusting the output layout of the document 601 to be printed to a multicolumn page layout such as a newspaper or a magazine, a plurality of pages can be re-laid out to a less number of pages as shown in FIG. 6B.

Algorithms of the layout conversion functions illustrated as examples in FIGS. 4A to 6B are relatively simple algorithms. Various algorithms are published such as those for reducing the number of pages of printed matter and those for reducing the amount of toner used in printed matter. As will be described later, the present invention relates to a method for tracking and tally processing the resource saving effects obtained through layout conversion processing executed outside the image forming apparatus, and thus what kind of algorithm is used to perform layout conversion does not matter. For this reason, examples of simple layout conversion algorithms are used here.

Table Configuration 1

FIGS. 7A to 7C and FIGS. 8A and 8B are illustrative diagrams showing various types of tables stored in the database (B) 335 in association with respective information.

FIG. 7A shows an example of a configuration of a device information management table 700. Column 701 is a column for storing device serial IDs. Column 702 is a column for storing manufacturer names. Column 703 is a column for storing model names. The device serial IDs are IDs (identification information) for uniquely identifying each image forming apparatus. At the time of manufacturing of image forming apparatuses, a device serial ID is assigned to each image forming apparatus, and the device serial ID recorded in a non-volatile storage area or the like can be read out later by the image forming apparatus. When the device serial ID is known, necessary information such as the model name of the image forming apparatus can be specified by referring to the device information management table 700.

FIG. 7B shows an example of a configuration of a tenant management table 710. In order for the print server 121 and the device management server 122 to be used not only by a single customer but also a plurality of customers, a system called multi-tenant system is required. In the multi-tenant system, devices such as servers, applications, databases and the like are shared, but each customer's data is logically segregated within the system to prevent access to each other's data. Such a multi-tenant system is used in cloud services and the like, and thus a detailed description thereof is omitted here. The tenant management table 710 is a basic table for managing multiple tenants. Column 711 is a column for storing tenant IDs. The tenant IDs are IDs that are uniquely assigned to each tenant. Column 712 is a column for storing tenant names.

FIG. 7C shows an example of a configuration of a user management table 720. Column 721 is a column for storing user IDs. The user IDs can be uniquely assigned to each user. Here, in order to identify a tenant to which each user belongs, a tenant ID is added after the at sign "@" of each user ID. Column 722 is a column for storing user names. By using the tenant management table 710 and the user management table 720, a user who accesses the print server 121 and the device management server 122 can be uniquely identified to allow access to only the data of the tenant to which the user belongs.

FIG. 8A shows an example of a configuration of a device management table 800. In the device management table 800, when the table name is followed by tenant information, it indicates that the tenant data in the device management table is logically segregated according to the multi-tenant system. For example, when the table name is followed by [AAA00002], it indicates that the data included in the device management, table belongs to a tenant having a tenant ID of AAA00002. This notation method applies to tables described below.

Column 801 is a column for storing device serial IDs. Columns 802 and 803 are columns for storing manufacturer names and model names, respectively. Column 804 is a column for storing device types. As the device types, "MFP" indicating a multifunction peripheral, "SFP" indicating a single-function printer and the like are stored. Column 805 is a column for storing color classification. As the color classification, "CL" indicating a color printer, "BW" indicating a monochrome printer and the like are stored.

FIG. 8B shows an example of a configuration of a device data updated date/time table 810. Column 811 is a column for storing device serial IDs. Column 812 is a column for storing the type of data. Column 813 is a column for storing the updated date and time of final data. In the column 813, the date and time (the updated date and time of final data) when job logs of an image forming apparatus having a corresponding device serial ID have been collected is stored. That is, it can be seen that the jobs before the date and time indicated by the column 813 have been collected, and the jobs after the date and time indicated by the column 813 have not yet been collected.

Record Configuration

FIG. 9 is an illustrative diagram showing an example of a configuration of job log records recorded in the job log recording unit 305 of the image forming apparatus 131. Column 901 is a column for storing job IDs which are sequential IDs uniquely assigned to each image forming apparatus. Column 902 is a column for storing job start date and time. Column 903 is a column for storing job end date and time. Column 904 is a column for storing job names. Column 905 is a column for storing the name or ID of job executing user.

Column 906 is a column for storing job end codes. With the end codes, the job completed state such as normal completion, abnormal completion or cancellation can be checked. Column 907 is a column for storing the type of job such as copying, scanning and printing. Column 908 is a column for storing the paper size used in the job. Column 909 is a column for storing the number of color pages of the print job. Column 910 is a column for storing the number of monochrome pages of the print job.

Column 911 is a column for storing a setting value of N-up printing. With this setting value, the number of pages to be printed on a single sheet of printing paper is determined. Column 912 is a column for storing a setting value of double-sided printing. Column 913 is a column for storing the number of color printed pages of the finally output printed matter. Column 914 is a column for storing the number of monochrome printed pages of the finally output printed matter. Column 915 is a column for storing the number of sheets of printing paper that were finally output.

Table Configuration 2

FIGS. 10A, 10B, 11A and 11B are illustrative diagrams showing various types of tables stored, in the database (B) 335.

FIG. 10A shows an example of a configuration of a job log table 1000. The job log transmission unit 306 of the image forming apparatus 131 transmits a job log record 900 and the device serial ID of the image forming apparatus 131 to the data registration unit 331, and the data registration unit 331 registers the received job log in the job log table 1000. Column 1001 is a column for storing the device serial ID of the image forming apparatus 131 which is a transmission source. Columns 1002 to 1008 are columns in which the values of the job log in the columns 901 to 907 of the job log record 900 shown in FIG. 9 are stored.

FIG. 10B shows an example of a configuration of a detailed job log table 1010. The detailed job log table 1010 is a table for storing detailed job information. Columns 1011 and 1012 are the same as the columns 1001 and 1002 of the job log table 1000. Columns 1013 to 1020 are columns in which the values of the job log in the columns 908 to 915 of the job log record 900 shown in FIG. 9 are stored. In this way, job logs transmitted from each image forming apparatus 131 by tenant are stored in the job log table 1000 and the detailed job log table 1010, whereby tally processing, which will be described later, becomes possible.

FIG. 11A shows an example of a configuration of a tenant tally setting table 1100. Column 1101 is a column for storing the start month of a year. Column 1102 is a column for storing the daily close time. Column 1103 is a column for storing the monthly close date. In the column 1101, a value indicating the month from which a year starts is stored when tally processing is performed by year. In this example, the year starts from January and ends in December. In the column 1102, a value indicating the close time when tally processing is performed by day is stored. In this example, one day is defined to start from 0:00:00 of a day and end at 0:00:00 of the following day. In the column 1103, a value indicating the close date when tally processing is performed by month is stored. In this example, one month is defined to start from the 26th of a previous month and ends on the 25th of the following month.

Column 1104 is a column for storing the time zone applied. A tally report is created for each tenant, and thus a time zone applied to perform tally processing is set for each tenant. Column 1105 is a column for storing tally start standby time. In the column 1105, a value indicating a lead time for finishing collection of data up to the previous day from all image forming apparatuses belonging to a tenant with respect to the value in the column 1102 is stored. In this example, the daily close time is 0:00, and thus collection of data from all image forming apparatuses is put on hold until 6:00:00, and tally processing is performed on the registered data from 6:00:00.

FIG. 11B shows an example of a configuration of a job log tally result table 1110. Column 1111 is a column for storing device serial IDs. Column 1112 is a column for storing a unit of time to perform tally processing. Columns 1113, 1114 and 1115 are columns for respectively storing the year, month and date when tally processing is performed. Column 1116 is a column for storing tally completion date and time. Column 1117 is a column for storing a tally completed state. Column 1118 is a column for storing the ID of the final job that has undergone tally processing. The final job ID corresponds to the job ID of the final one of the job logs that have undergone tally processing with respect to the tally date of the corresponding record.

FIGS. 12A to 12C are illustrative diagrams showing various types of tables stored in the database (A) 324.

FIG. 12A shows an example of a configuration of a service execution history table 1200. Column 1201 is a column for storing job ticket IDs. Column 1202 is a column for storing the start date and time when required processing started. Column 1203 is a column for storing the end date and time when the required processing ended. Column 1204 is a column for storing device serial IDs for specifying an image forming apparatus 131 that is a processing request source. Column 1205 is a column for storing job IDs for specifying a job that is a processing request source. Column 1206 is a column for recording whether the content to be printed that, was eventually converted by the layout conversion unit 323 was used in printing by the image forming apparatus 131.

FIG. 12B shows an example of a configuration of a detailed service execution history table 1210. Column 1211 is a column for storing job ticket IDs. Column 1212 is a column for storing service IDs of executed services. In the print server 121, the layout conversion unit 323 provides layout conversion processing as a service. However, the print server 121 can also provide various other services such as file format conversion and PDL (Page Description Language) conversion. Accordingly, when there are a plurality of services, the service ID is handled as a unique ID indicating information for specifying which service was used.

Column 1213 is a column for storing function IDs for specifying which function of a service specified by the service ID was executed. In the case of the layout conversion unit 323, the margin removal processing, the image/character region deletion and replacement processing, the combined layout processing and the like correspond to such functions. Each of such functions is identified by the function ID, and which function was used can be specified. Column 1214 is a column for storing reference metadata IDs.

FIG. 12C shows an example of a configuration of a metadata record table 1220. Column 1221 is a column for storing metadata IDs for identifying individual metadata. The reference metadata IDs stored in the column 1214 of the detailed service execution history table 1210 shown in FIG. 12B are link information to the metadata ID in the column 1221. Column 1222 is a column for storing the number of pages before one of the functions of the layout conversion processing is executed. Column 1223 is a column for storing the number of pages after one of the functions of the layout conversion processing is executed. Column 1224 is a column for storing the number of pages reduced as a result of execution of one of the functions of the layout conversion processing. In the column 1224, the difference between the value in the column 1222 and the value in the column 1223 is stored.

Processing Sequence

Figure 13B:
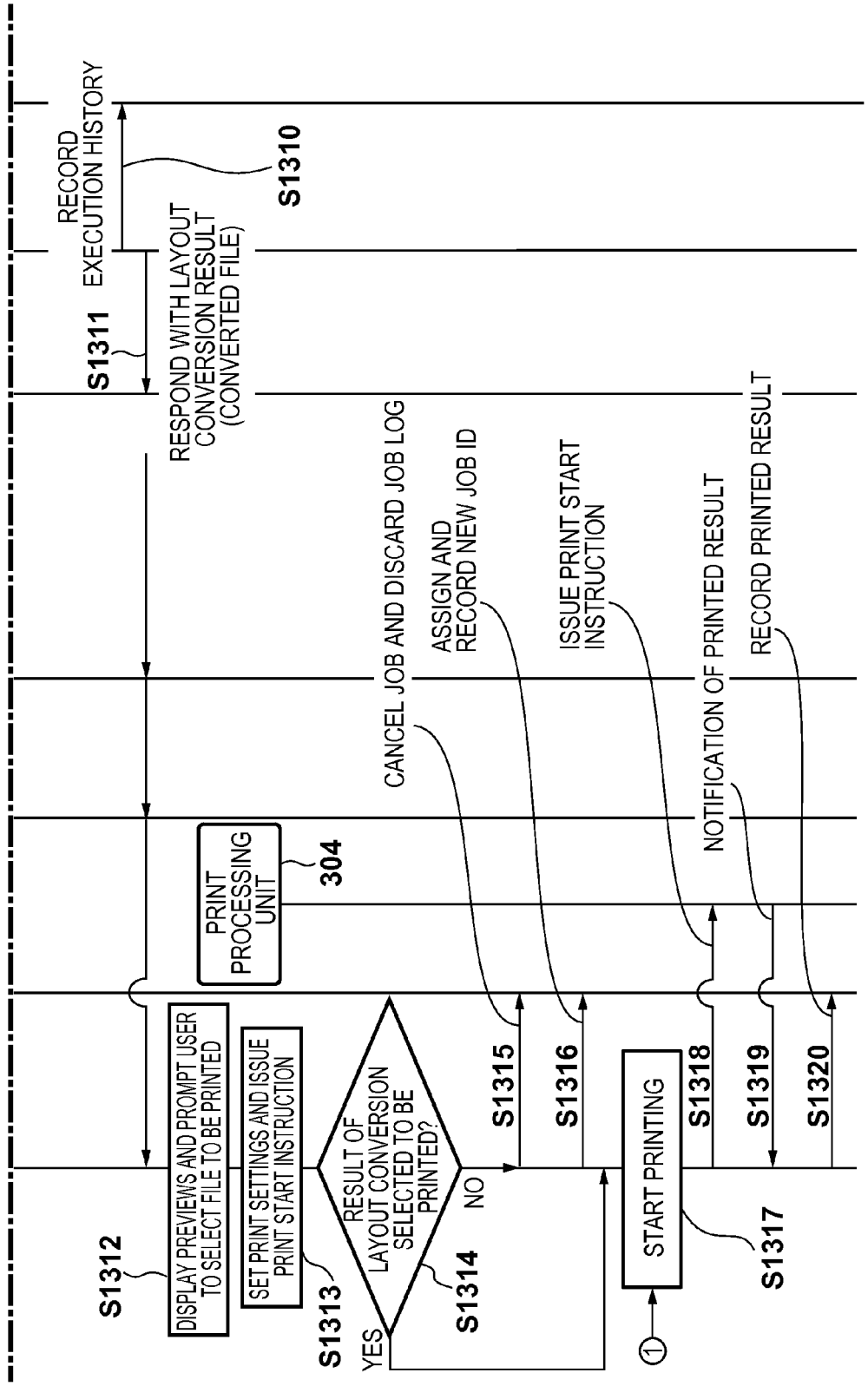

FIGS. 13A and 13B are sequence diagrams illustrating a processing flow of the image forming apparatus 131 requesting the print server 121 to perform layout conversion processing, receiving the result of processing, and executing printing.

First, the application 301 transmits an available function request to the layout conversion unit 323 (S1301). The layout conversion unit 323 returns a list of functions available at that point in time to the application 301 (S1302). The application 301 displays the received list of functions as available functions, and prompts the user to select a function to be used (S1303). When the user selects a function to be used and issues an instruction to start a job, the application 301 starts the job (S1304). At the start of the job, the application 301 obtains a new job ID from the job log recording unit 305, and records the start of the job in a job log (S1305).

The application 301 determines whether the layout conversion function has been selected by the user (S1306). If it is determined that the layout conversion function has not been selected (NO in S1306), the procedure advances to S1317, where printing is started as a normal print job. If it is determined that the layout conversion function has been selected (YES in S1306), the application 301 transmits a layout conversion request to the layout conversion unit 323 (S1307). At this time, a file to be subjected to layout conversion and a job ticket are transmitted.

FIG. 14 is an illustrative diagram showing a data structure of a job ticket. A job ticket 1401 is an example of a job ticket expressed in the XML (Extensible Markup Language). In the Service Id attribute of the Target Service element, a service ID indicating requested processing is designated. In the Function Id attributes of the Function elements, the function IDs of functions that need to be executed are designated. In this example, execution of the functions having function IDs of "F-001", "F-003" and "F-005" of the service having a service ID of "S-0001" is requested. In the Device Serial Id attribute of the Job Information element, a device serial ID indicating the image forming apparatus that is the request source is designated. Also, in the Job Id attribute, the job ID of the job that is the request source is designated.

Returning to FIGS. 13A and 13B, upon receiving the layout conversion request, the layout conversion unit 323 returns a response to the conversion request to the application 301 (S1308). The layout conversion unit 323 executes, on the received target file, the functions of the layout conversion processing designated by the job ticket (S1309). The layout conversion unit 323 records the results of the layout conversion processing in the service execution history table 1200, the detailed service execution history table 1210 and the metadata record table 1220 (S1310). The layout conversion unit 323 transmits the converted file obtained as a result of the layout conversion processing as a response to the request to the application 301 (S1311).

The application 301 displays both a preview before layout conversion processing and a preview after layout conversion processing, and prompts the user to select a file to be printed (S1312). Furthermore, the application 301 displays a screen for selecting print settings, and prompts the user to select print settings (S1313).

Figure 15A:
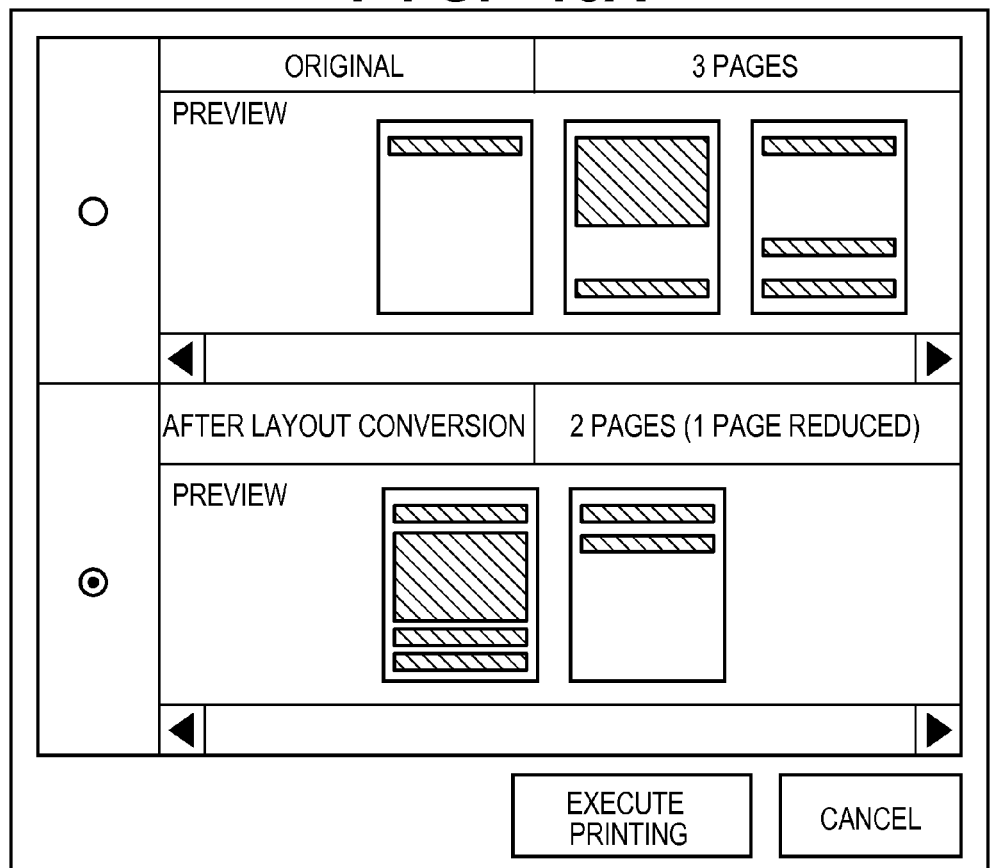
FIGS. 15A and 15B are diagrams showing an example of a preview screen and a print setting screen.
Figure 15B:
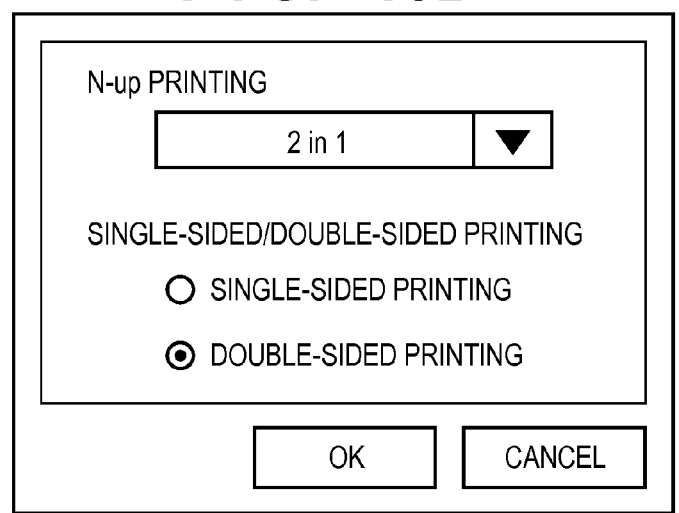

FIGS. 15A and 15B are illustrative diagrams showing a preview screen and a print setting screen displayed by the application 301 in steps S1312 and S1313. FIG. 15A shows a preview screen 1501. In the preview screen 1501, a preview and the number of pages of the original content to be printed, and a preview and the number of pages of the content to be printed that has undergone layout conversion processing are displayed. Then, the user is prompted to select either the original file or the file that has undergone layout conversion processing by using a radio button, and an instruction to print the selected file is issued with the use of a print execution button.

FIG. 15B shows a print setting screen 1502. On the print setting screen 1502, the user is prompted to select the type of printing such as N-up printing and single-sided or double-sided printing so as to determine print settings.

Returning to FIGS. 13A and 13B, the application 301 determines whether the result of layout conversion processing has been selected as a file to be printed (S1314). If it is determined that the result of layout conversion processing has not been selected (NO in S1314), the application 301 temporarily cancels the ongoing job, and instructs the job log recording unit 305 to discard the job log (S1315). Furthermore, the application 301 obtains a new job ID from the job log recording unit 305, and records the start of the new job (S1316). Then, the application 301 starts printing of the file to be printed (S1317).

If, on the other hand, it is determined that the result of layout conversion processing has been selected (YES in S1314), the procedure advances to S1317, where the application 301 starts printing of the file to be printed. The application 301 transmits a print start instruction to the print, processing unit 304 (S1318). Upon completion of the print processing, the print processing unit 304 notifies the application 301 of the printed result (S1319). The application 301 requests the job log recording unit 305 to record the printed result (S1320). The job log recording unit 305 records the printed result in the job log record 900. Through the above processing, the processing sequence ends.

Description of Tally Processing

FIG. 16 is an illustrative diagram showing a data structure of a tally definition used by the tally unit 334 to execute tally processing. A tally definition 1601 is an example of a tally definition expressed in the XML. For each Counting Definition element, one tally definition is expressed. In this example, a service ID and function IDs are combined and defined as a search condition for performing tally processing of printing paper saving effects.

FIG. 17 is a diagram illustrating how the number of pages and the number of sheets of a document to be printed change by application of print settings. Original document 1701 shows the number of pages of an original document. The number of sheets when print settings are not applied to the original document 1701 is indicated by a1. a1 is calculated based on the values written in the columns 1014 and 1015 of the detailed job log table 1010. The number of sheets when N-up printing is applied to the original document 1701 is indicated by a2. a2 is calculated based on the values written in the columns 1014, 1015 and 1016 of the detailed job log table 1010. Furthermore, the number of sheets when double-sided printing is applied is indicated by a3. a3 is the value written in the column 1020 of the detailed job log table 1010.

Figure 18:
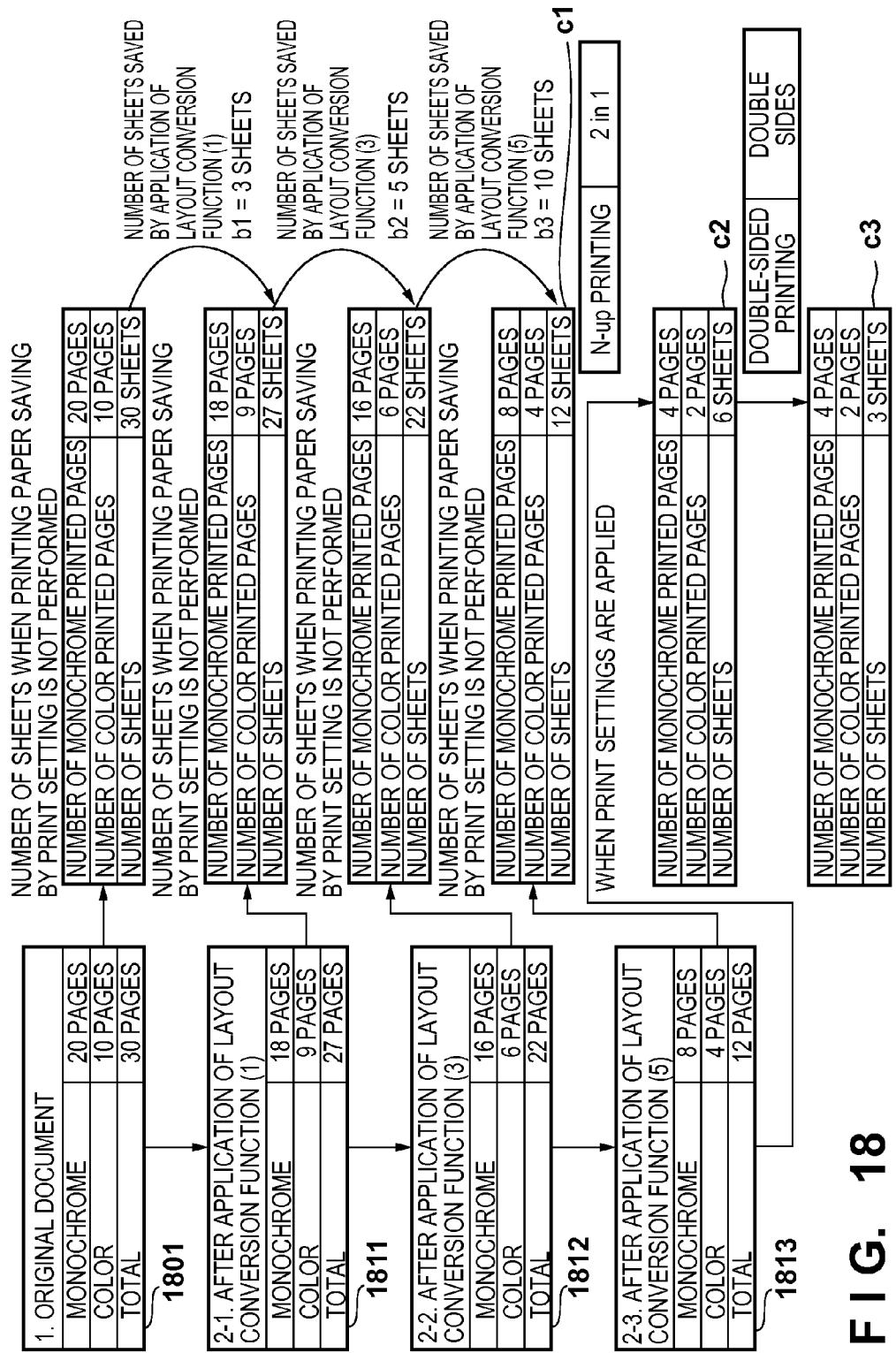
FIG. 18 is a diagram illustrating changes in the number of pages of a document to be printed and the number of sheets required to print the document to be printed when layout conversion processing and a print setting are applied.

FIG. 18 is a diagram illustrating how the number of pages and the number of sheets of a document to be printed change by application of print settings and layout conversion processing. Original document 1801 shows the number of pages of an original document. Documents 1811, 1812 and 1813 respectively show the number of pages obtained after each function of the layout, conversion processing has been applied. As layout conversion functions (1), (3) and (5) used here, for example, the above-described layout conversion functions may be used, but the present invention is not limited thereto.

The number of sheets saved by application of the layout conversion function (1) is indicated by b1 (=3=30−27). b1 is the value written in the first row of the column 1224 of the metadata record table 1220. Likewise, the number of sheets saved by application of the layout conversion function (3) is indicated by b2 (=5=27−22). b2 is the value written in the second row of the column 1224 of the metadata record table 1220. Likewise, the number of sheets saved by application of the layout conversion function (5) is indicated by b3 (=10=22−12). b3 is the value written in the third row of the column 1224 of the metadata record table 1220.

The number of pages of the original document 1801 is changed to that shown in the document 1813 by application of the three functions of the layout conversion processing, which is the converted result obtained as a result of the series of layout conversion processing. The number of sheets when print settings are not applied to the document 1813 is indicated by c1. c1 is calculated based on the values written in the columns 1014 and 1015 of the detailed job log table 1010. The number of sheets when N-up printing is applied to the document 1813 is indicated by c2. c2 is calculated based on the values written in the columns 1014, 1015 and 1016 of the detailed job log table 1010. The number of sheets when double-sided printing is further applied is indicated by c3. c3 is the value written in the column 1020 of the detailed job log table 1010.

Figure 19:
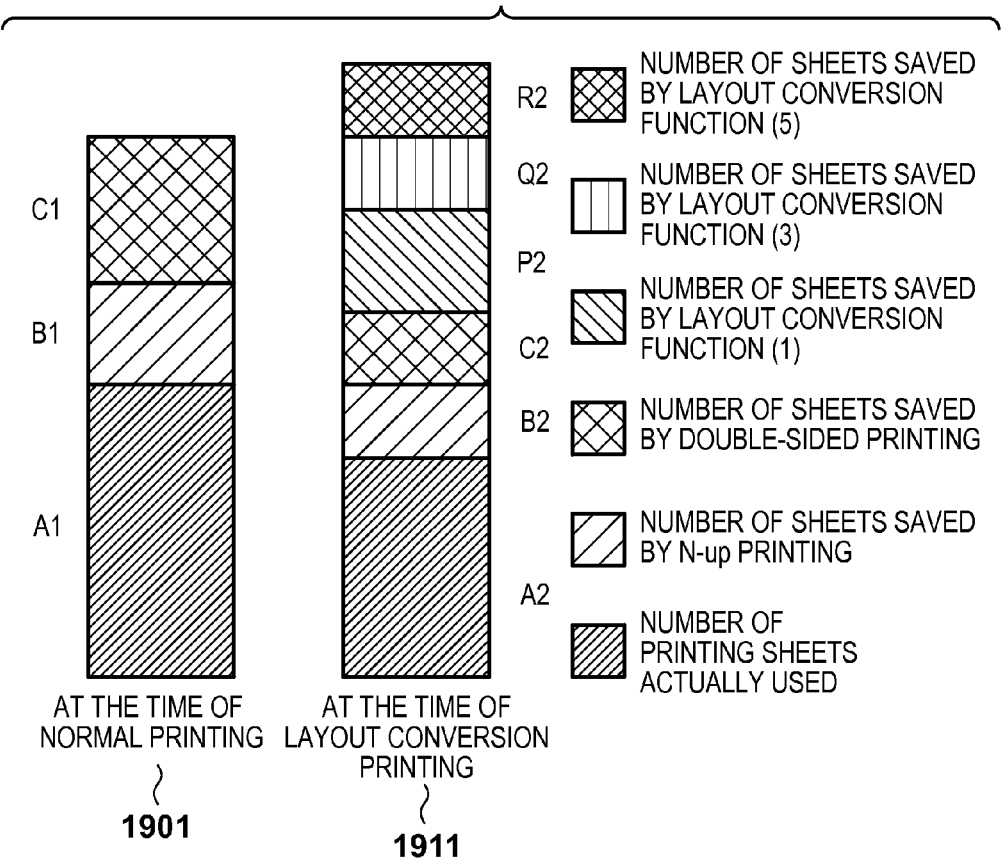
FIG. 19 is a diagram showing graphs indicating printing paper saving effects.

FIG. 19 are graphs showing printing paper saving effects. Graph 1901 is a graph at the time of normal printing in which the layout conversion processing was not used. At the time of normal printing, the number of sheets of printing paper that were actually used is indicated by A1, and the number of sheets saved by a print, setting is indicated by B1 and C1. Calculation formulas 1902 are calculation formulas for determining values of A1, B1 and C1. Graph 1911 is a graph when printing was performed using the layout conversion processing. At the time of layout conversion printing, the number of sheets of printing paper that were actually used is indicated by A2, and the number of sheets saved by a print setting is indicated by B2 and C2, and the number of sheets saved by each function of the layout conversion processing is indicated by P2, Q2 and R2. Calculation formulas 1912 are calculation formulas for determining values of A2, B2, C2, P2, Q2 and R2. The signs used in the calculation formulas 1902 and 1912 correspond to those of FIGS. 17 and 18.

FIG. 20 is an illustrative diagram showing a printing paper saving effect tally table 2000 stored in the database (B) 335. Column 2001 is a column for storing device serial IDs. Column 2002 is a column for storing the date or month when tally processing is performed. Column 2003 is a column for storing the type of printing such as normal printing or layout conversion printing. Column 2004 is a column for storing the number of sheets of printing paper used. The value written in the column 2004 corresponds to the value of A1 or A2 shown in FIG. 19.

Column 2005 is a column for storing the number of sheets saved by N-up printing. The value written in the column 2005 corresponds to the value of B1 or B2 shown in FIG. 19. Column 2006 is a column for storing the number of sheets saved by double-sided printing. The value written in the column 2006 corresponds to the value of C1 or C2 shown in FIG. 19. Columns 2007, 2008 and 2009 are columns for storing the number of sheets saved by each function of the layout conversion processing. The values of the columns 2007, 2008 and 2009 respectively correspond to the values of P2, Q2 and R2 shown in FIG. 19.

Figure 21B:
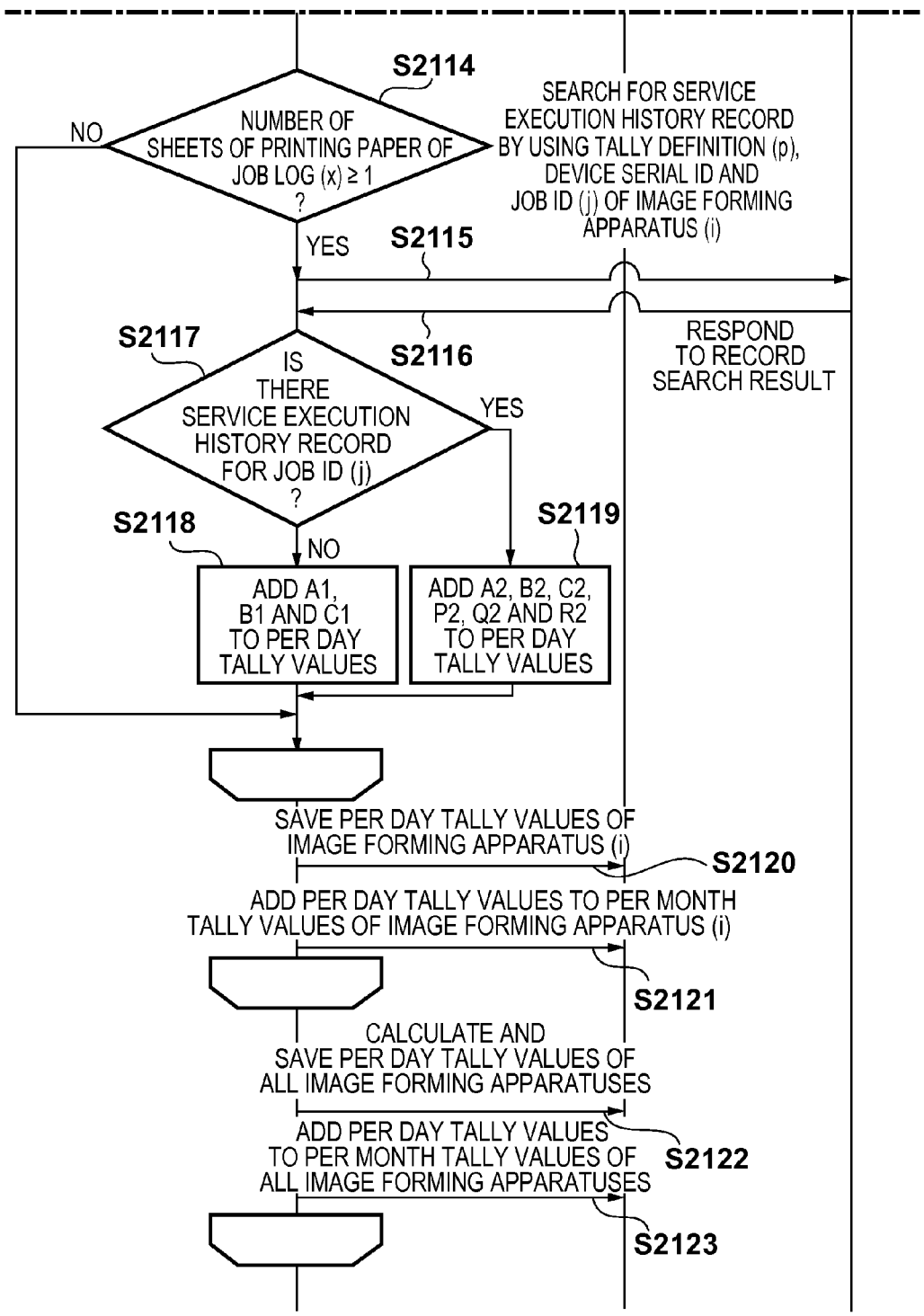

FIGS. 21A and 21B are sequence diagrams illustrating a flow of tally processing executed by the tally unit 334 of the device management server 122. First, the tally unit 334 obtains a tally definition 1601 from the database (B) 335 (S2101, S2102). Next, the tally unit 334 searches the device management table 800 to obtain a list of image forming apparatuses belonging to the tenant (S2103, S2104). The tally unit 334 obtains, from the job log tally result table 1110, a final job ID Y on the previous tally date of an image forming apparatus (i) (N≥i≥1) among N image forming apparatuses included in the obtained list (S2105, S2106). The tally unit 334 searches the job log table 1000 to obtain a job ID Z of the final record of the job log whose job end date and time 1004 matches the current tally date (S2107, S2108).

The tally unit 334 performs tally processing with respect to the job logs having job IDs from Y+1 to Z in the job log table 1000 and the detailed job log table 1010. First, a job log (x) having a job ID (j) (Z≥j≥Y+1) or an image forming apparatus (i) is obtained (S2109, S2110). The tally unit 334 determines whether there is a record of the job log (x) (S2111). If it is determined that there is no record of the job log (x) (NO in S2111), the tally unit 334 searches the service execution history table 1200 stored in the database (A) 324 for the device serial ID and job ID (j) of the image forming apparatus (i). If there is a corresponding record, the tally unit 334 sets "FALSE" in the column 1206 (used in printing) (S2112, S2113). Through this processing, in the records in the service execution history table 1200, it is possible to distinguish between execution history of executed print jobs that were actually used and execution history of unexecuted print jobs that were not used. By distinguishing the execution history of unused print jobs, it can be used in, for example, data analysis to determine why the print jobs were not used, or deleted as unnecessary records. If it is determined that there is a record of the job log (x) (YES in S2111), the processing of S2113 and S2114 is omitted.

Next, the tally unit 334 determines whether the number of sheets of printing paper of the job log (x) is 1 or greater (S2114). If it is determined that the number of sheets of printing paper of the job log (x) is not 1 or greater (NO in S2114), the processing performed on the job log (x) ends, and the procedure advances to processing on the next job log (job log (x+1)). If it is determined that the number of sheets of printing paper of the job log (x) is 1 or greater (YES in S2114), the tally unit 334 searches for a service execution history record by using a tally definition (p), and the device serial ID and the job ID (j) of the image forming apparatus (i) (S2115, S2116). The tally definition (p) is a combination of a service ID and function IDs that are defined in the tally definition 1601. The tally unit 334 searches the service execution history table 1200 to obtain a record having the corresponding device serial ID and job ID. Furthermore, the tally unit 334 obtains, from the detailed service execution history table 1210, a record having the job ticket ID of the obtained record and the service ID and function IDs that are defined in the tally definition (p). If there is a corresponding record, necessary data is obtained from the metadata record table 1220 by using the reference metadata ID.

The tally unit 334 determines based on the search result whether there is a service execution history record for the job ID (j) (S2117). If it is determined that there is no service execution history record (NO in S2117), the tally unit 334 calculates A1, B1 and C1 with respect to the job log (x), and adds the calculated values to respective per day tally values of the image forming apparatus (i) (S2118). A1, B1 and C1 are determined by using the calculation formulas 1902 shown in FIG. 19. If it is determined that there is a service execution history record (YES in S2117), the tally unit 334 calculates A2, B2, C2, P2, Q2 and R2 with respect to the job log (x), and adds the calculated values to respective per day tally values of the image forming apparatus (i) (S2119). A2, B2, C2, P2, Q2 and R2 are determined by using the calculation formulas 1912 shown in FIG. 19.

When the tally processing has been executed on all of the job logs having job IDs from Y+1 to Z, the tally unit. 334 saves the per day tally values of the image forming apparatus (i) in the printing paper saving effect tally table 2000 (S2120). Furthermore, the tally unit 334 adds the per day tally values of the image forming apparatus (i) to the per month tally values in the printing paper saving effect tally table 2000 (S2121). When the tally processing has been executed on all of the image forming apparatuses, the tally unit 334 saves the per day tally values of all of the image forming apparatuses in the printing paper saving effect tally table 2000 (S2122). Furthermore, the tally unit 334 adds the per day tally values of all of the image forming apparatuses to the per month tally values in the printing paper saving effect tally table 2000 (S2123). Here, the method for tallying the per day tally values and the per month tally values was described, but the same applies to the case where tally processing is performed per three months, per six months or per year.

Figure 22A:
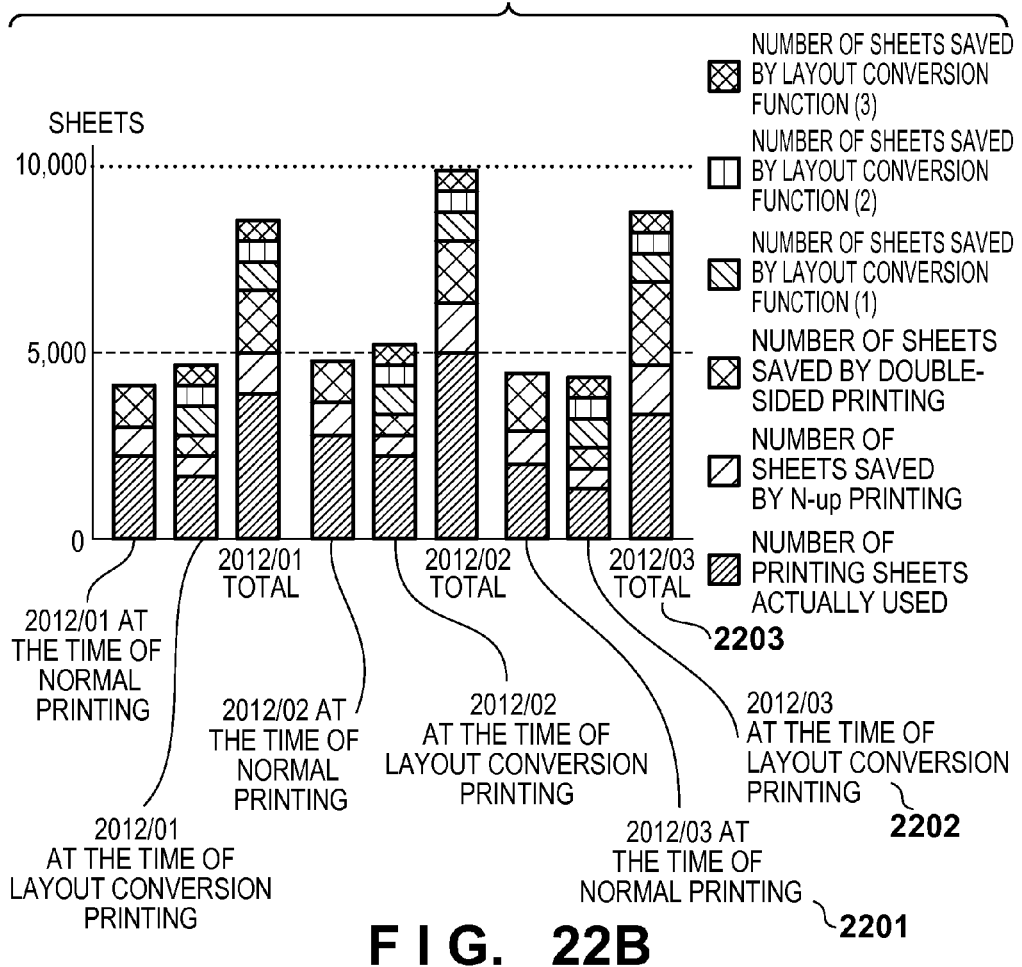
FIGS. 22A and 22B are diagrams showing graphs indicating resource saving effects obtained by a layout conversion function and a print setting.
Figure 22B:
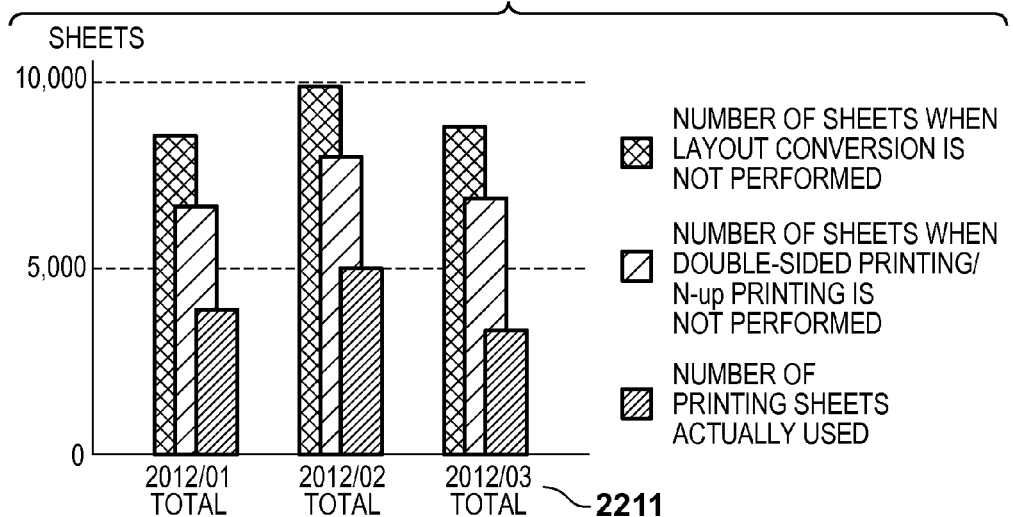

FIGS. 22A and 22B are graphs indicating (consumable) resource reduction effects obtained by the layout conversion functions and the print settings. Graph 2201 shown in FIG. 22A is a stacked bar chart of A1, B1 and C1 at the time of normal printing per month. Graph 2202 is a stacked bar chart of A2, B2, C2, P2, Q2 and R2 at the time of layout conversion printing. Graph 2203 is a stacked bar chart obtained by combining the values of the two graphs 2201 and 2202. In other words, the graph 2203 indicates the value of A1+A2, the value of B1+B2, the value of C1+C2, the value of P2, the value of Q2, and the value of R2.

Graph 2211 shown in FIG. 22A is a comparative bar chart between the number of sheets of printing paper that were actually used, the number of sheets of printing paper in the case where the layout conversion processing was not performed, and the number of sheets of printing paper in the case where the double sided-printing or N-up printing was not performed. In other words, the graph 2211 indicates the value of A1+B1, the value of A1+B1+C1+C2, and the value of A1+B1+C1+C2+P2+Q2+R2.

These graphs are provided by the report display/output unit 333 providing a display/output screen to the browser 311 so as to be viewed. It is thereby possible to display a unified report of tally values of saving effects obtained by the layout conversion functions and the print settings so as to be viewed. This solves the problem described above.

Also, as further effects of the present invention, even when a new function is added to the layout, conversion unit 323, it is unnecessary to change the system of collecting job logs in the image forming apparatus 131 and the device management server 122. By simply changing the tally definition 1601, the saving effects obtained by the new function can be tallied.

Embodiment 2

In Embodiment 1, the layout conversion request source was the image forming apparatus 131. As Embodiment 2, a case will be described in which a document to be printed is input from a client computer to the print server 121, the layout conversion processing is executed, and the image forming apparatus 131 prints the result of layout conversion processing. Hereinafter, only differences between Embodiment 1 and Embodiment 2 will be described with reference to FIGS. 1, 3 and 23. Note that, among FIGS. 1 to 22B illustrating Embodiment 1, only FIGS. 13A and 13B and FIGS. 15A and 15B are diagrams used only in Embodiment 1. The other diagrams are common to Embodiment 1 and Embodiment 2, and a description thereof is the same as that of Embodiment 1. Accordingly, the description is omitted here.

System Configuration

In FIG. 1, the client computers 141 and 142 are constituent elements added in Embodiment 2. The client computers 141 and 142 can be any of personal computers, tablet computers, smart phones and the like. Here, a description will be given taking client computers as an example. Other than this, Embodiment 2 has the same configuration as Embodiment 1.

In FIG. 3, the job obtaining unit 307 and the virtual printer driver unit 322 are constituent elements added in Embodiment 2. The job obtaining unit 307 obtains a print job from the print server 121. The virtual printer driver unit 322 receives a file to be printed from the client computer 141, and performs PDL conversion to issue a print job to the image forming apparatus 131. Note that the image processing unit 302, the conversion request unit 303 and the conversion request accepting unit 321 are not used in Embodiment 2. Other than this, Embodiment 2 has the same configuration as Embodiment 1.

In the application of the print server 121 in Embodiment 2, a file to be printed is input from the client computer 141 into the print server 121, a print job is sent to the image forming apparatus 131, and printing is executed. At this time, the virtual printer driver unit 322 can request the layout conversion unit 323 to perform layout conversion processing on the file to be printed, whereby saving of print resources can be achieved.

Processing Sequence

FIGS. 23A and 23B are sequence diagrams illustrating processing for performing printing by using the layout conversion unit 323 from the client computer 141. When the image forming apparatus 131 is ready to receive a print job, the application 301 of the image forming apparatus 131 transmits a printer on-line notification to the virtual printer driver unit 322 (S2301). The printer on-line notification refers to information indicating that the image forming apparatus 131 is present on the network in a communicable state with the print server 121. The virtual printer driver unit 322 returns a response to the printer on-line notification (S2302).

The browser 311 in the client computer 141 transmits and inputs a document to be printed to the virtual printer driver unit 322 (S2303). The virtual printer driver unit 322 returns a response to the input of the document to be printed (S2304). The browser 311 prompts the user to select layout conversion functions to be used and enter print settings, and transmits the selected result and the print settings to the virtual printer driver unit 322 (S2305).

The virtual printer driver unit 322 transmits a layout conversion request to the layout conversion unit 323 (S2306). The layout conversion unit 323 executes layout conversion processing (S2307). The layout conversion unit 323 records the result of layout conversion processing in the service execution history table 1200, the detailed service execution history table 1210 and the metadata record table 1220 (S2308). The layout conversion unit 323 returns the result of layout conversion processing to the virtual printer driver unit 322 (S2309).

The virtual printer driver unit 322 returns a preview screen for comparing before and after the layout conversion processing to the browser 311 (S2310). The browser 311 prompts the user to select a file to be printed and transmits the selected result and a print start instruction to the virtual printer driver unit 322 (S2311). The virtual printer driver unit 322 converts the file to be printed into a PDL file (S2312). The virtual printer driver unit 322 notifies the application 301 of the print start instruction and an obtained URL of the print job (S2313).

The application 301 obtains a job ID from the job log recording unit 305 and records the start of the job (S2314). The application 301 transmits a print job obtaining request, the device serial ID and the job ID to the virtual printer driver unit 322 (S2315).

The virtual printer driver unit 322 determines whether the result of layout conversion processing was selected as a file to be printed in S2311 (S2316). If it is determined that the result of layout conversion processing was not selected as a file to be printed (NO in S2316), the virtual printer driver unit 322 sets "FALSE" in the column 1206 (used in printing) of the corresponding record of the service execution history table 1200 recorded in S2308 (S2317). If it is determined that the result of layout conversion processing was selected as a file to be printed (YES in S2316), the processing of S2317 is not performed. The device serial ID and the job ID that were notified from the application 301 are recorded in the columns 1204 and 1205 of the corresponding record in the service execution history table 1200 recorded in S2308 (S2318). The virtual printer driver unit 322 returns the PDL data and necessary control information to the application 301 as a print job (S2319).

The application 301 instructs the print processing unit 304 to start, printing by using the received print, job data (S2320).

Upon completion of printing of the received print job, the print processing unit 304 notifies the application 301 of the printed result (S2321). The application 301 instructs the job log recording unit 305 to record the printed result (S2322). The job log recording unit 305 records the printed result in the job log record 900. Through the above processing, the processing sequence ends.

As described with reference to FIGS. 23A and 23B, even when the print request source is the client, computer 141 (142), as in the processing flow of Embodiment 1 (FIGS. 13A and 13B), the result, of conversion processing by the layout conversion unit 323 can be recorded in the service execution history table 1200. Also, the device serial ID and the job ID required by the tally unit 334 to perform tally processing of printing paper saving effects are also recorded as in Embodiment 1. Accordingly, even when the result of layout conversion processing is not used as a target to be printed, information indicating an unused state can be added as in Embodiment 1. Therefore, regardless of the print request source being the image forming apparatus 131 or the client computer 141 (142), it is unnecessary to change the system of collecting job logs in the image forming apparatus 131 and the device management server 122.

Also, the method for tallying printing paper saving effects is the same as the processing flow of Embodiment 1 (FIGS. 21A and 21B), and thus no change needs to be made. That is, regardless of the print request source being the image forming apparatus 131 or the client computer 141 (142), a unified report of tally values of saving effects obtained by the layout conversion functions and the print settings can be displayed and viewed, whereby the problem described above can be solved.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that, the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-014834, filed Jan. 29, 2013, which is hereby incorporated by reference herein in its entirety.

What is claimed is:

1. A management system comprising:
a processing unit configured to perform layout processing on data of a job processed by an image forming apparatus;
a holding unit configured to hold, in a storage unit, identification information of the image forming apparatus, identification information of the job and content of the layout processing performed on the data of the job by the processing unit in association with each other;
a transmission unit configured to transmit the data that has undergone the layout processing to the image forming apparatus;
an obtaining unit configured to obtain history information of the job processed by the image forming apparatus; and
a tally unit configured to perform tally processing with respect to the job processed by the image forming apparatus, by using the history information and the content of the layout processing held in the storage unit in association with the identification information of the image forming apparatus corresponding to the history information and the identification information of the job included in the history information.

2. The management system according to claim 1, wherein the tally unit performs tally processing with respect to the layout processing defined as a tally target in advance.

3. The management system according to claim 1, wherein the tally unit performs tally processing by analyzing information regarding reduction effects of consumables at the time of processing of the job by the image forming apparatus based on print settings indicated by the history information and the content of the layout processing held in the storage unit.

4. The management system according to claim 1, wherein if the image forming apparatus executes the job without using data that has undergone the layout processing performed by the processing unit, the content of the layout processing held in the storage unit is not used in the tally processing performed by the tally unit.

5. The management system according to claim 1, wherein the content of the layout processing includes at least one of a margin removal function, an image region deletion function, a character region deletion function, an image region replacing function, and a character region replacing function.

6. The management system according to claim 1, further comprising an output unit configured to output a result obtained through the tally processing performed by the tally unit.

7. The management system according to claim 1, wherein the management system is constituted by a plurality of apparatuses, and
an apparatus including the processing unit and an apparatus including the tally unit are different apparatuses.

8. An image forming apparatus comprising:
a holding unit configured to hold, in a storage unit, a job whose print settings have been designated;
a request unit configured to send a request for layout processing on data of the job to a management system;
an accepting unit configured to accept the data that has undergone the layout processing from the management system;
a processing unit configured to perform processing on the job by using the data that has undergone the layout processing and the print settings; and
a transmission unit configured to transmit history information of the job processed by the processing unit in order to perform tally processing in the management system,
wherein the request and the history information include identification information of the image forming apparatus and identification information of the job.

9. The image forming apparatus according to claim 8, wherein if the processing unit executes the job without using the data that has undergone the layout processing, the history information of the job does not include the identification information of the job included in the request.

10. The image forming apparatus according to claim 9, wherein if the processing unit executes the job without using the data that has undergone the layout processing, in the history information of the job, a job history including new identification information that is different from the identification information of the job included in the request is recorded.

11. The image forming apparatus according to claim 8, wherein the content of the layout processing includes at least one of a margin removal function, an image region deletion function, a character region deletion function, an image region replacing function, and a character region replacing function.

12. A print system comprising a management system and an image forming apparatus,
wherein the management system comprises:
a processing unit configured to perform layout processing on data of a job processed by an image forming apparatus;
a holding unit configured to hold, in a storage unit, identification information of the image forming apparatus, identification information of the job and content of the layout processing performed on the data of the job by the processing unit in association with each other;
a transmission unit configured to transmit the data that has undergone the layout processing to the image forming apparatus;
an obtaining unit configured to obtain history information of the job processed by the image forming apparatus; and
a tally unit configured to perform tally processing with respect to the job processed by the image forming apparatus, by using the history information and the content of the layout processing held in the storage unit in association with the identification information of the image forming apparatus corresponding to the history information and the identification information of the job included in the history information, and
wherein the image forming apparatus comprises:
a holding unit configured to hold, in a storage unit, a job whose print settings have been designated;
a request unit configured to send a request for layout processing on data of the job to a management system;
an accepting unit configured to accept the data that has undergone the layout processing from the management system;
a processing unit configured to perform processing on the job by using the data that has undergone the layout processing and the print settings; and
a transmission unit configured to transmit history information of the job processed by the processing unit in order to perform tally processing in the management system,
wherein the request and the history information include identification information of the image forming apparatus and identification information of the job.

13. A method for controlling a management system comprising:
- a processing step of performing layout processing on data of a job processed by an image forming apparatus;
- a holding step of holding, in a storage unit, identification information of the image forming apparatus, identification information of the job and content of the layout processing performed on the data of the job in the processing step in association with each other;
- a transmission step of transmitting the data that has undergone the layout processing to the image forming apparatus;
- an obtaining step of obtaining history information of the job processed by the image forming apparatus; and
- a tally step of performing tally processing with respect to the job processed by the image forming apparatus, by using the history information and the content of the layout processing held in the storage unit in association with the identification information of the image forming apparatus corresponding to the history information and the identification information of the job included in the history information.

14. A method for controlling an image forming apparatus comprising:
- a holding step of holding, in a storage unit, a job whose print settings have been designated;
- a requesting step of sending a request for layout processing on data of the job to a management system;
- an accepting step of accepting the data that has undergone layout processing from the management system;
- a processing step of processing the job by using the data that has undergone the layout processing and the print settings; and
- a transmission step of transmitting history information of the job processed in the processing step in order to perform tally processing in the management system,
- wherein the request and the history information include identification information of the image forming apparatus and identification information of the job.

15. A non-transitory computer-readable medium storing a program for causing a computer to function as:
- a processing unit configured to perform layout processing on data of a job processed by an image forming apparatus;
- a holding unit configured to hold, in a storage unit, identification information of the image forming apparatus, identification information of the job and content of the layout processing performed on the data of the job by the processing unit in association with each other;
- a transmission unit configured to transmit the data that has undergone the layout processing to the image forming apparatus;
- an obtaining unit configured to obtain history information of the job processed by the image forming apparatus; and
- a tally unit configured to perform tally processing with respect to the job processed by the image forming apparatus, by using the history information and the content of the layout processing held in the storage unit in association with the identification information of the image forming apparatus corresponding to the history information and the identification information of the job included in the history information.

16. A non-transitory computer-readable medium storing a program for causing a computer to function as:
- a holding unit configured to hold, in a storage unit, a job whose print settings have been designated;
- a request unit configured to send a request for layout processing on data of the job to a management system;
- an accepting unit configured to accept the data that has undergone the layout processing from the management system;
- a processing unit configured to perform processing on the job by using the data that has undergone the layout processing and the print settings; and
- a transmission unit configured to transmit history information of the job processed by the processing unit in order to perform tally processing in the management system,
- wherein the request and the history information include identification information of the image forming apparatus and identification information of the job.

* * * * *